United States Patent
Okamori et al.

(10) Patent No.: US 6,527,396 B2
(45) Date of Patent: Mar. 4, 2003

(54) OPTICAL DEVICE AS WELL AS PROJECTOR UNIT AND REAR PROJECTOR SYSTEM USING THE SAME

(75) Inventors: Shinji Okamori, Tokyo (JP); Shinsuke Shikama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/963,562

(22) Filed: Sep. 27, 2001

(65) Prior Publication Data

US 2002/0008856 A1 Jan. 24, 2002

Related U.S. Application Data

(62) Division of application No. 09/413,865, filed on Oct. 7, 1999, now Pat. No. 6,322,219.

(30) Foreign Application Priority Data

Oct. 21, 1998 (JP) .......................................... 10-299417

(51) Int. Cl.[7] .............................................. G03B 21/28
(52) U.S. Cl. ........................................ 353/98; 353/99
(58) Field of Search .............................. 353/38, 98, 99, 353/102, 69; 345/5, 8

(56) References Cited

U.S. PATENT DOCUMENTS

| 5,321,789 A | 6/1994 | Kida et al. |
| 5,592,188 A | 1/1997 | Doherty et al. |
| 5,634,704 A | 6/1997 | Shikama et al. |
| 5,795,049 A | 8/1998 | Gleckman |
| 5,868,481 A | 2/1999 | Conner et al. |
| 5,902,033 A | 5/1999 | Levis et al. |
| 6,005,722 A | 12/1999 | Butterworth et al. |
| 6,139,156 A | 10/2000 | Okamori et al. |
| 6,322,219 B1 * | 11/2001 | Okamori et al. .............. 353/98 |

FOREIGN PATENT DOCUMENTS

JP   1039240   2/1998

OTHER PUBLICATIONS

Larry J. Hornbeck, "Digital Light Processing for High Brightness, High–Resolution Applications", SPIE vol. 3013, pp. 27–40.

* cited by examiner

Primary Examiner—William Dowling
(74) Attorney, Agent, or Firm—Birch, Stewart, Kolasch & Birch, LLP

(57) ABSTRACT

An optical device including an illuminant for emitting light; light condensing element composed of a reflecting mirror whose shape of reflecting plane is of rotational secondary curved surface and a condenser lens for converging approximately parallel fluxes; a mixing rod whose section is quadrangle, first lens element composed of at least one lens; and a reflecting optical element which is disposed near the position where a plurality of tertiary illuminants are formed and which reflects light in a desired direction. This optical device allows a distribution of illuminance whose intensity is highly uniform to be obtained even when a light flux is inputted from a direction inclined from the normal direction of the plane-to-be-illuminated by illuminating the optical device disposed out of an optical axis of the illuminator.

4 Claims, 19 Drawing Sheets

F (FORCAL POINT)

OPTICAL DEVICE AS WELL AS PROJECTOR UNIT AND REAR PROJECTOR SYSTEM USING THE SAME

This application is a divisional of application Ser. No. 09/413,865, filed on Oct. 7, 1999, now U.S. Pat. No. 6,322,219, the entire contents of which are hereby incorporated by reference and for which priority is claimed under 35 U.S.C. §120; and this application claims priority of Application No. 10-299417 filed in JAPAN on Oct. 21, 1998 under 35 U.S.C. §119.

BACKGROUND OF THE INVENTION

1. Field of the Invention

The present invention relates to an optical device as well as a projector unit and a rear projector unit using the same.

2. Description of the Related Art

A projector system is drawing attention lately as a large screen display unit and a CRT projector system using a small, high definition and luminous CRT, a liquid crystal projector system using a liquid crystal panel, a DMD projector system using DMDs (Digital Micro-mirror Device) and others are manufactured. Among them, the DMD is one of light bulbs for the projector system which is being expected most because it is congenial to displaying computer information and to digital TV broadcasting in principle because it is a digital driving element.

The structure of the DMD will be explained at first. The DMD is fabricated by arraying a large number of micro-mirrors of 16 $\mu$m×16 $\mu$m for example on a silicon substrate so as to control reflecting directions of incident light per each mirror by electrically controlling them. The respective micro-mirrors correspond to pixels and image information may be displayed by projecting the light on a screen via a projector lens. FIG. 1 is a perspective view showing the structure of two pixels of DMD elements. The figure shows micro-mirrors 510 and 511 which are inclined from the normal line of an element 600 by +10 degrees or −10 degrees, respectively.

Aluminum is evaporated on the surface of the micro-mirrors 510 and 511 so that the micro-mirrors operate as square mirrors for example having high reflectivity. The direction in which light is reflected may be switched by the tilting angle of the micro-mirrors and the light intensity from DMD is controlled by pulse width modulating (PWM) the micro mirrors. Such micro-mirrors are arrayed two-dimensionally in accordance to a predetermined format of 480×640 or of 600 ×800 for example to construct as a light bulb. The DMD is detailed in Larry J. Hornbeck, "Digital Light Processing for High-Brightness, High-Resolution Applications", SPIE Vol. 3013, pps. 27–40 and others, so that a further detailed explanation thereof will be omitted here.

Next, the principle of an optical system of a video projector using the DMD as a light bulb will be explained with reference to FIG. 2. FIG. 2 is a conceptual diagram for explaining the principle of display of the DMD by means of a single plate DMD projector unit which comprises an illuminant 150 such as a metal halide lamp, a DMD 601, a light absorber 602 for absorbing unnecessary light and a projector lens 80. In the figure, micro-mirrors 512 and 513 which are turned (tilted) by +10 degrees and a micro-mirror 514 which is turned (tilted) by −10 degrees in the DMD 601 are conceptually enlarged. In FIG. 2, light emitted from the illuminant 150 enters the DMD elements from the direction tilted by +20 degrees from the normal direction of the DMD 601. The light reflected by the micro-mirror 514 which is turned by −10 degrees deviates from the projector lens 80 and is absorbed by the light absorber 602, thus becoming a pixel of a black point on a screen not shown. Meanwhile, the light reflected by the micro-mirrors 512 and 513 which are turned (tilted) by +10 degrees are condensed by the projector lens 80, thus becoming pixels of bright points on the screen. Thus, the micro-mirror image on the DMD 601 is enlarged and projected on the screen as an image. It is also possible to display a color image by a single plate projector unit in which a rotary color filter is disposed within the optical path or by a three plate type projector unit which separates light into three primary colors of RGB and modulates per each color by arraying a dichroic prism and a dichroic filter.

By the way, as it is apparent from the operating principle of the DMD described above, the most characteristic condition in illuminating the DMD is that the illuminating light must be inputted with a predetermined angle from the normal direction of the plane-to-be-illuminated.

FIG. 3 is a schematic diagram showing the structure of a prior art color image display unit for displaying color images by using the DMD. It has been disclosed in JP-A-10-039240 for example. In FIG. 3, the unit comprises a DMD 603, micro-mirrors 515 and 516 composing the DMD, a parallel white color illuminant 151 emitting parallel white light, an optical thin film 400 causing transmission light of specific wavelength corresponding to an incident angle, an imaging lens 800 and a screen 900.

What should be noticed most here is the disposition of the parallel white color illuminant 151 with respect to the DMD 603. That is, the parallel white illuminant 151 is disposed in the direction inclined by a predetermined angle $\alpha1$ with respect to the DMD 603 so as to input the parallel white light to the respective mirrors arrayed two-dimensionally on the DMD 603. The white light incident on the DMD 603 is reflected by the mirrors 515 and 516 whose tilting angle $\theta1$ is controlled and is then guided to the screen 900 by the imaging lens 800. While the optical thin film 400 is inserted to display color images, an explanation of its operation will be omitted here. The oblique illumination described above is required not only in the single plate projector unit of this example but also in a DMD projector unit of the type of a plurality of plates in common.

It is apparent that when the plane-to-be-illuminated is illuminated by concentric illuminating light fluxes, i.e., fluxes having a distribution of intensity rotationally symmetric about an optical axis from the direction tilted from its normal line, a distribution of the illuminated light is not concentric on the illuminated plane.

FIG. 4 is a diagram schematically showing the DMD 604 illuminated by the illuminating light fluxes having the concentric distribution of intensity and seen from the normal direction. Curves within the figure conceptually show equi-intensity lines by connecting points of the equal light intensity. Here, the flux of the illuminating light is inputted to the DMD 604 from the direction tilted by 45 degrees from one edge as indicated by an arrow in the figure and so that the optical axis of the illuminating light flux is tilted by 20 degrees from the normal line of the surface of the DMD. Accordingly, there arises a problem that the distribution of light intensity on the DMD surface is not concentric about the center point of the DMD 604 as shown in the figure and uneven illumination asymmetric in the up and down and right and left directions which is very inappropriate as a projector unit occurs on a screen. It is noted that the distribution of intensity in the present specification means the distribution of intensity of light within a plane vertical to the optical axis of the light flux.

The uneven illumination maybe relatively readily reduced by digital signal processing in case of the DMD projector unit. That is, it may be achieved by standardizing the intensity of projecting light per pixel by decreasing the gradation within the screen more than the original gradation for example so that the distribution of illuminance is uniformed on the whole screen based on a pixel to which the illuminating light of the least intensity enters. However, the improvement of the image quality by means of such light reducing process is not desirable from the aspect of the utility factor of the light. Because the DMD is a reflecting type light bulb, it has a merit that it is relatively strong against heat as compared to a transmission type light bulb and allows a high output illuminant such as a xenon lamp and a metal halide lamp of several hundreds W to 2 or 3 kW classes to be used. However, the rate of the light of the illuminant reaching to the screen in the end, i.e., the utility factor of the light, has stayed around several % with respect to the original output of the light of the illuminant similarly to the projector units using the other light bulbs. Accordingly, it has been important to reduce the uneven illumination caused by the optical system also in order to improve the utility factor of the light in each structural element.

Then, an illuminating optical system using a mixing rod for example has been employed in the prior art projector unit in order to enhance the uniformity of illumination of the light bulb.

FIG. 5 is a conceptual diagram of the illuminating optical system using the mixing rod having rectangular input and output end faces. In the figure, the system comprises an illuminant 152, a reflecting mirror 200, a mixing rod 300, a lens 401, and a light bulb 605. Light emitted from the illuminant 152 is condensed by the reflecting mirror 200 and is inputted to the mixing rod 300 disposed so that its input end face is positioned in the vicinity of the condensing point.

The light is mixed while propagating within the mixing rod 300 by repeating total reflect ion by several times at the interface of the glass and air. This mixing reduces the uneven brightness of the illuminating flux peculiar to the illuminant 152 and to the reflecting mirror 200 and allows a highly uniform diverging flux whose section is rectangular to be obtained at the output end face of the mixing rod 300. Accordingly, the uniformity of illumination of the light bulb 605 may be improved efficiently by forming the image of the output end face of the mixing rod in the vicinity of the light bulb 605 by the following lens 401. Thus, the method by means of the mixing rod 300 is characterized in that the illuminating flux having the desirable uniformity and shape of flux may be set totally independently from the following illuminating optical system. See U.S. Pat. No. 5,634,704 about the detail of the illuminating system using such a mixing rod. It is noted that the shape of flux in the present specification refers to the sectional shape of the flux on a plane vertical to the optical axis of the flux.

The uniform illumination method by means of the mixing rod as described above allows the maximum effect to be obtained when the light bulb, i.e., the plane-to-be-illuminated, is disposed vertically to the optical axis of the illuminating light. However, it has caused a problem that the angle of the image of the output end face of the mixing rod does not coincide with that of the surface of the DMD and uneven illumination occurs unavoidably after all even hen the illuminating flux is inputted from a predetermined direction with respect to the DMD by disposing a plane mirror within the illuminating light path.

In a multi-projector system in which a large screen is constructed by arraying a plurality of projector units (or rear-projector units) horizontally and vertically, it is not strictly required not to improve the light utility factor but also to make borders of screens inconspicuous by minimizing the difference of brightness and color among the respective screens or the difference of brightness and color in the vicinity of the borders of the arrayed projected screens in particular. Accordingly, there has been a problem that the uniformity of brightness and color must be enhanced in maximum and the uneven illumination must be eliminated in the projected screen of each projector unit (or the rear-projector unit).

SUMMARY OF THE INVENTION

In view of the problems described above, with regard to the oblique illumination of an arbitrate plane typified by the illumination of the above-mentioned DMD, an object of the present invention is to provide a optical device, as well as a projector unit and a rear projector unit using the same, which allows a uniform and highly symmetrical distribution of illuminance to be obtained on a plane-to-be-illuminated even when an illuminating flux is inputted from a direction having a predetermined inclination with respect to the normal direction of the plane-to-be-illuminated.

In order to achieve the above-mentioned object, the inventive optical device comprises illuminant means which is a primary illuminant; light condensing means for condensing rays outgoing from the illuminant means to form a secondary illuminant; uniforming means whose input end face is disposed in the vicinity of position where the secondary illuminant is formed and which outputs rays whose uniformity of intensity is higher than the rays incident on the input end face from its output end face; first lens means for condensing the outgoing rays of the uniforming means to form a plurality of tertiary illuminants within an optical path; and a reflecting optical element which is disposed in the vicinity of position where the plurality of tertiary illuminants are formed and which reflects the outgoing rays of the first lens means in a desired direction.

By constructing as described above, the optical device allows a uniform and highly symmetrical distribution of illumination to be obtained at the plane-to-be-illuminated disposed in the vicinity of the position where the image of the output end face of the uniforming means is formed when the light flux is inputted from a direction inclined from the normal direction of the plane-to-be-illuminated.

DESCRIPTION OF THE PREFERRED EMBODIMENTS

First Embodiment

Figure 1:
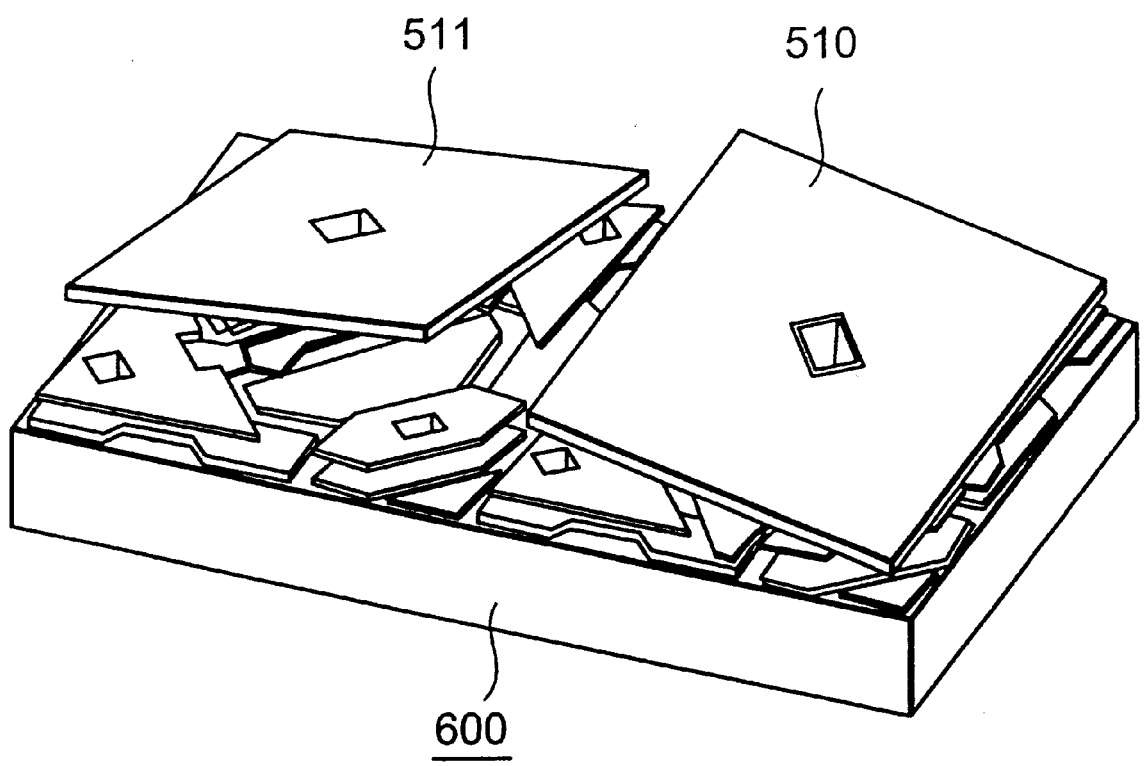
FIG. 1 is a perspective view showing the structure of a DMD of two pixels.
Figure 2:
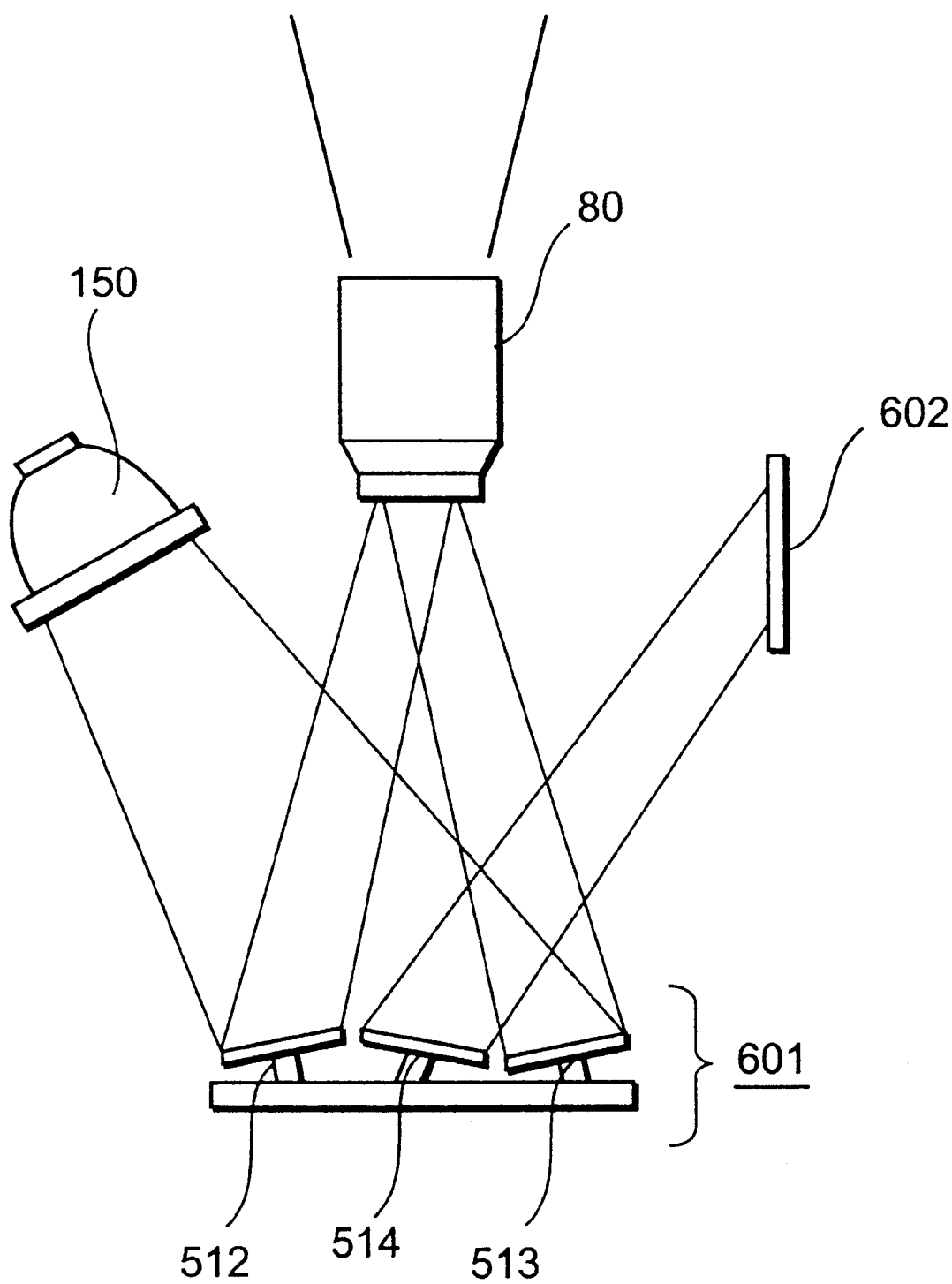
FIG. 2 is a conceptual diagram for explaining the display principle of the DMD.
Figure 3:
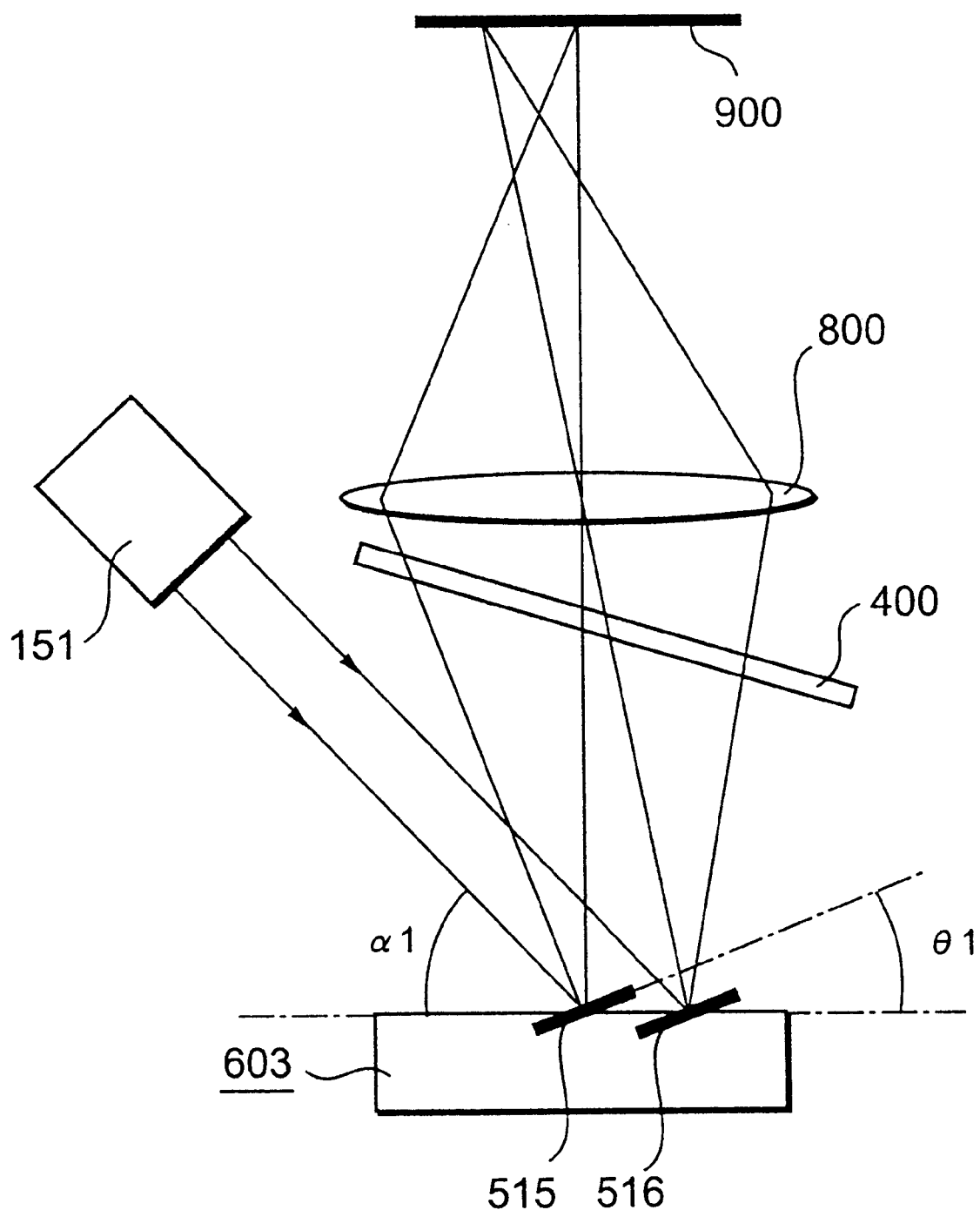
FIG. 3 is a schematic structural diagram showing a prior art color image display unit.
Figure 4:
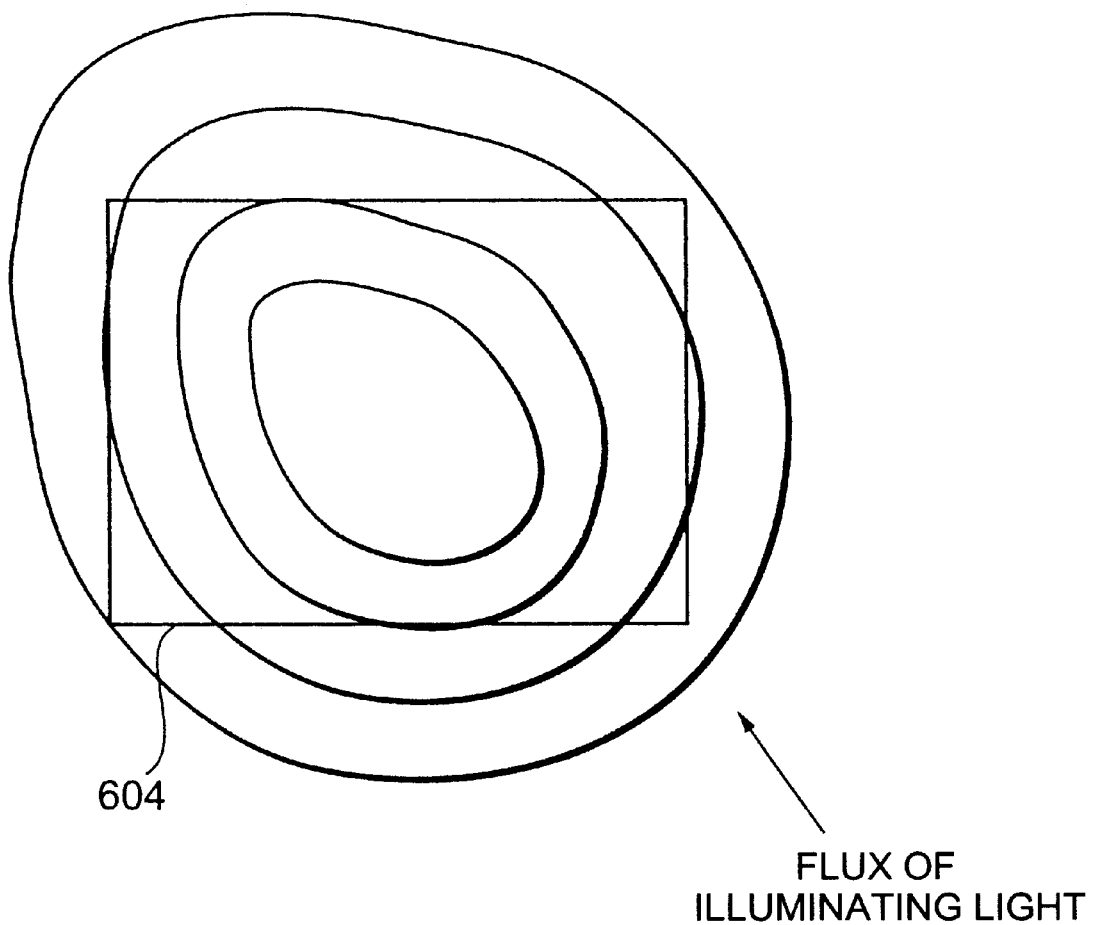
FIG. 4 is a diagram schematically showing the illuminated DMD.
Figure 5:
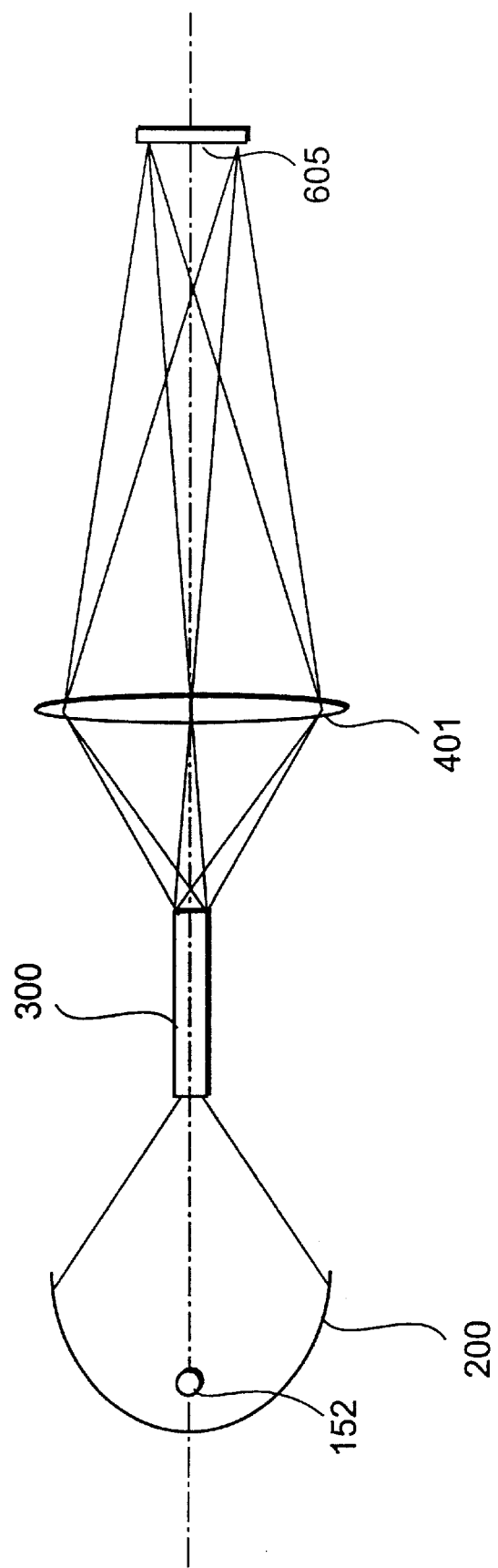
FIG 5 is a conceptual diagram of an illuminating optical system using a mixing rod.
Figure 6:
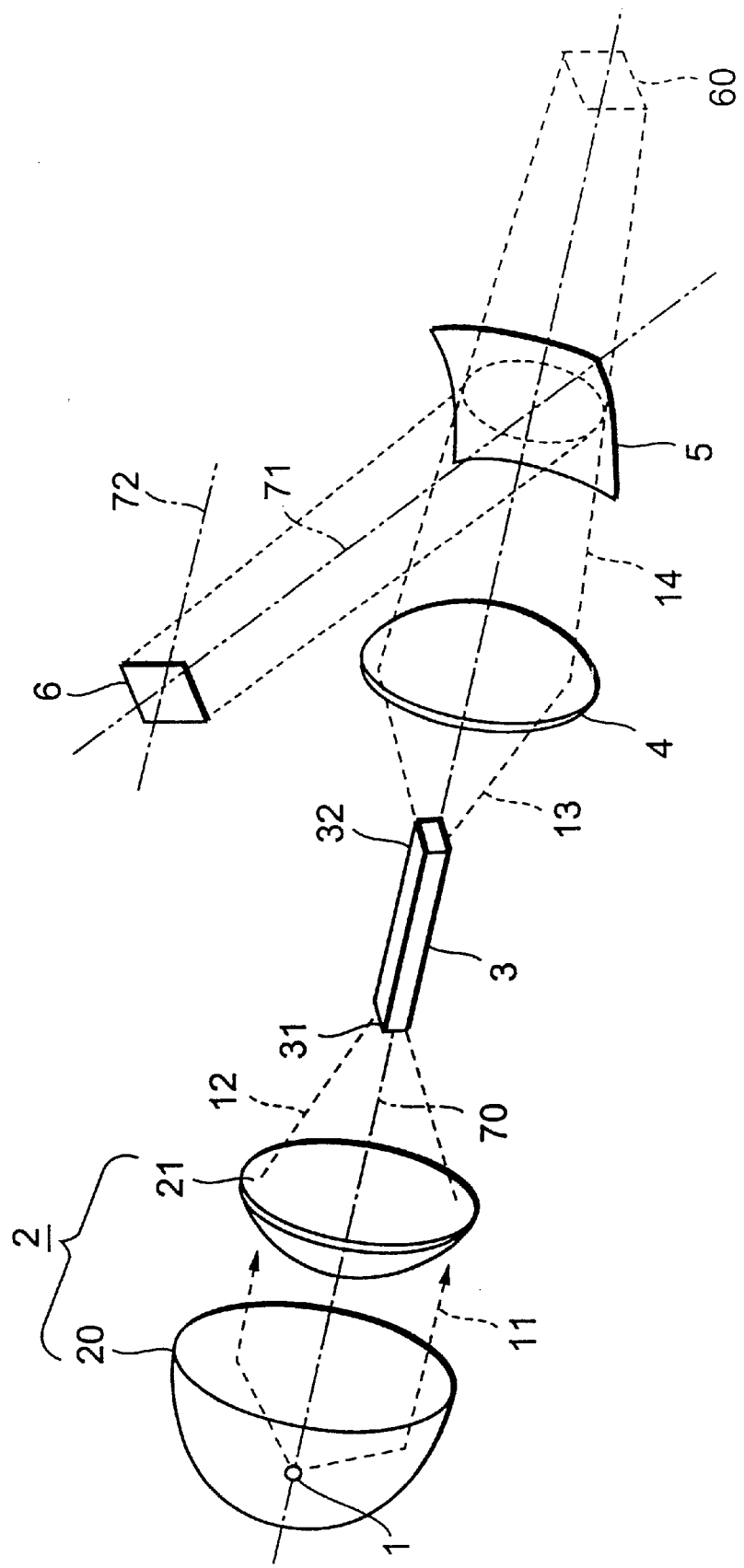
FIG. 6 is a schematic diagram showing the structure of an optical device according to a first embodiment.

FIG. 6 is a schematic diagram showing the structure of an optical device according to the present embodiment. The optical device comprises illuminant means 1 which is a primary illuminant emitting light, condensing means 2 composed of a reflecting mirror 20 whose reflecting plane is formed as a rotational quadratic curved plane and condenser lens (second lens means) 21 for converging a near parallel flux, a mixing rod 3 (uniforming means) whose section is square, first lens means 4 composed of at least one lens and a reflecting optical element 5 described below and illuminates a plane-to-be-illuminated 6, e.g., an image displaying plane of a light bulb such as a DMD, which is disposed out of an optical axis 70 of the illuminating unit.

The operation of this optical device will be explained with reference to FIG. 6. In FIG. 6, the light emitted from the illuminant 1 is transformed into the near parallel flux 11 by the reflecting mirror 20 having the rotational parabolic plane and then to a convergent flux 12 by the rear condenser lens 21. An image of the illuminant 1, i.e., a secondary illuminant, is formed around the position where the diameter of the convergent flux 12 is minimized. Next, an input end face 31 of the mixing rod 3 is disposed in the vicinity of the position where this secondary illuminant is formed. At this time, the mixing rod 3 is disposed so that the axis of the illuminating light prescribed by the rotational axis of the reflecting mirror 20 and the center axis of the condenser lens 21 coincides with the longitudinal axis of the rod.

The light inputted incident on the mixing rod 3 propagates therein while repeating total reflection by the side face and is outputted from the output end face 32, thus becoming a divergent flux 13. The first lens means 4 positioned at the rear side of the mixing rod 3 is disposed so as to form an image of the output end face 32 of the mixing rod 3 on a virtual plane-to-be-illuminated 60 set on an illuminating light axis 70. It is noted that the case when the first lens means 4 is composed of one lens will be explained in the present embodiment to simplifying the explanation.

The reflecting optical element 5 deflects an illuminating flux 14 formed by the first lens means 4 in the direction of the plane-to-be-illuminated 6, i.e., in the direction along an optical axis 71, and guides to the rectangular plane-to-be-illuminated 6 having a normal line 72 tilted by a predetermined angle from the optical axis 71. At this time, the reflecting optical element 5 is disposed so that the angle formed between the illuminating optical axis 70 and the optical axis 71 coincides with the angle formed between the normal line 72 of the plane-to-be-illuminated 6 and the optical axis 71. In such a case, the plane-to-be-illuminated 6 is illuminated efficiently by the rectangular flux analogous to the output end face 32 of the mixing rod 3 similarly to the virtual plane-to-be-illuminated 60.

Figure 8:
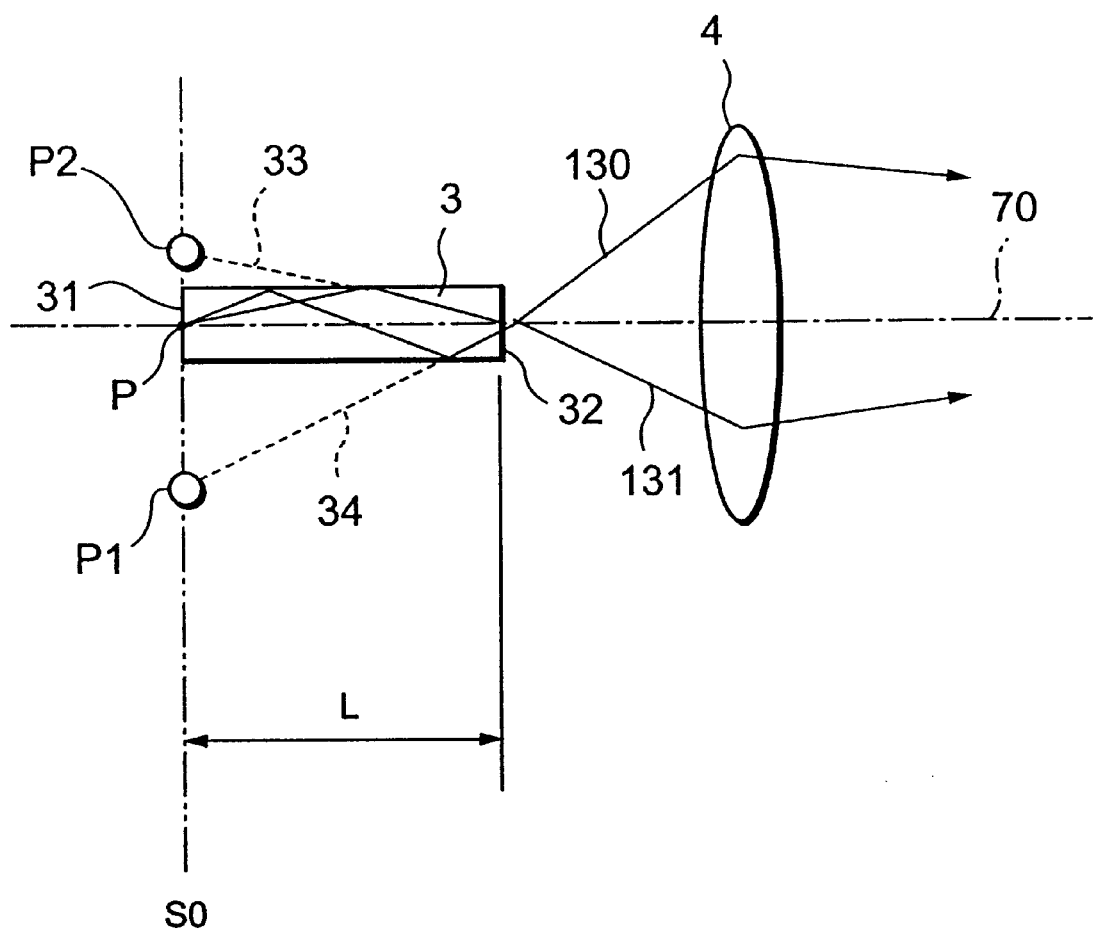
FIG. 8 is a schematic diagram showing the relationship between the virtual secondary illuminant and a tertiary illuminant group.

The operation of the optical device will be explained further in detail. FIG. 8 is a schematic diagram for explaining about the virtual secondary illuminant caused by the mixing rod 3. In the figure, a point (P) denotes the secondary illuminant, (S0) a plane on which the virtual secondary illuminant is formed, (33 and 34) virtual rays reaching to the output end face 32 of the mixing rod 3 from the virtual secondary illuminants P1 and P2, and actual divergent rays (130 and 131) caused by the virtual secondary illuminants P1 and P2. (L) denotes the length of the mixing rod 3. The other reference numerals are the same with those in FIG. 6, so that their explanation will be omitted here.

At first, the rays emitted out of the secondary illuminant formed at the point P propagate through the mixing rod 3 while totally reflecting on the side face thereof and enter the first lens means 4 as the divergent rays 130 and 131. The mixing rod 3 is made of a uniform material such as transparent glass and plastic and is disposed within a medium satisfying the relationship of n>n0, where n is an index of refraction of the mixing rod 3 and n0 is an index of refraction of the medium in which the mixing rod 3 is disposed. It is supposed that the mixing rod 3 is disposed within air (n0≈1) in the present embodiment.

The rays emitted out of the secondary illuminant formed at the point P propagate through the mixing rod 3 while repeating the total reflection by a predetermined number of times at the interface of the mixing rod 3 with the air from such relationship of indices of refraction. At this time, the rays seem to be outputted from the virtual secondary illuminants P1 and P2 existing on the extension of the rays 33 and 34 apparently when seen from the side of the output end face 32. A large number of virtual secondary illuminants are formed on the plane S0 beside those two points shown in the figure from the same reason.

Meanwhile, the output end face 32 of the mixing rod 3 becomes an opening for passing all of the rays emitted out of those large number of virtual secondary illuminants. The fluxes from the large number of virtual secondary illuminants are superimposed and a rectangular illuminant having highly uniform intensity is formed at the output end face 32.

That is, the mixing of the rays by means of the mixing rod 3 allows the highly uniform rectangular illuminant to be obtained from the secondary illuminants having the nonuniform distribution of intensity.

Figure 7:
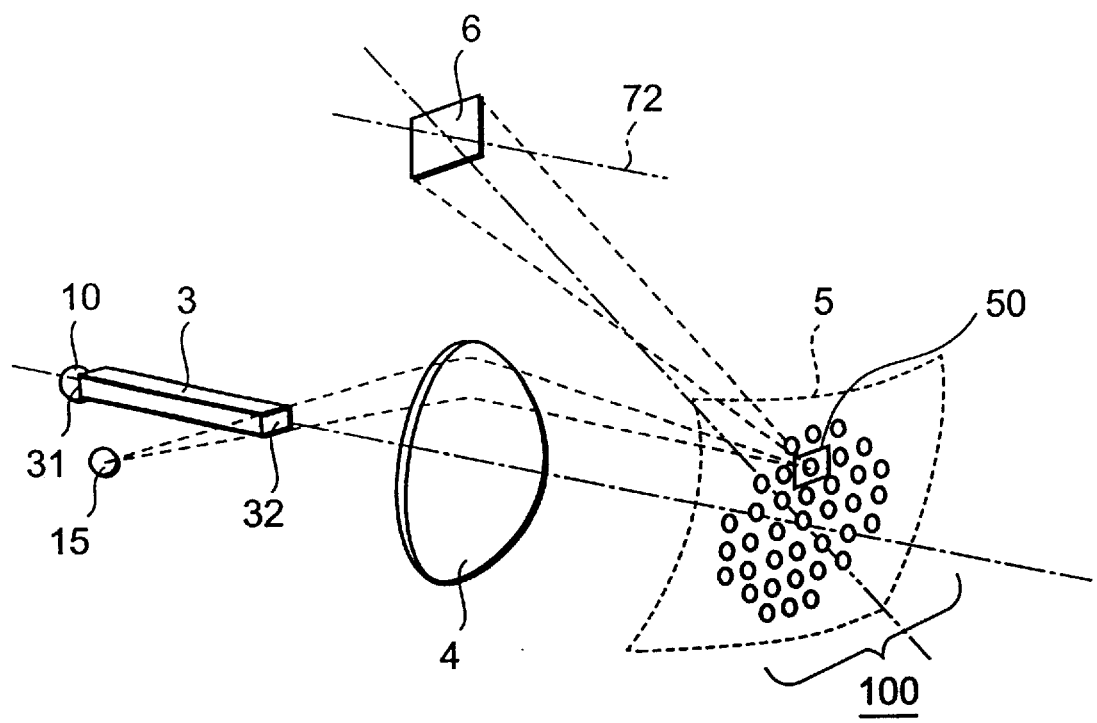
FIG. 7 a schematic diagram for explaining about a virtual secondary illuminant.

FIG. 7 is a schematic diagram showing the relationship between the above-mentioned virtual secondary illuminant and a tertiary illuminant group formed by the imaged virtual secondary illuminants. In FIG. 7, the reference numeral (10) denotes the secondary illuminant, (15) one of the virtual secondary illuminants, (100) the tertiary illuminant group and (50) a micro-reflecting plane of the reflecting optical element 5, respectively. The other reference numerals are the same with those shown in FIG. 6, so that their explanation will be omitted here.

The first lens means 4 has the operation of forming the rectangular illuminant image formed at the output end face 32 of the mixing rod 3 on the plane-to-be-illuminated 6. At this time, the imaging relationship of the first lens means 4 holds also to the virtual secondary illuminant 15. That is, the tertiary illuminant group 100 is formed at the predetermined position from the respective relationships of the focal distance of the whole system of the first lens means 4 and of the plurality of virtual secondary illuminants. The reflecting optical element 50 corresponding to the size of the tertiary illuminant is disposed around the position of the tertiary illuminant group 100 to deflect the incident convergent flux in the direction of the plane-to-be-illuminated 6. The ray from the virtual secondary illuminant is converged into the smallest spot in the vicinity of the tertiary illuminant plane, so that the ray may be deflected efficiently by the reflecting optical element 50. Such micro-reflecting planes 50 are disposed discontinuously and adjacent to each other to form a reflecting plane of the reflecting optical element 5 as a whole.

FIG. 7 shows the imaging relationship between one virtual secondary illuminant 15 and the corresponding tertiary illuminant and a state in which the ray is guided to the plane-to-be-illuminated 6 by the reflecting optical element 50. Thus, the image of the output end face of the mixing rod 3 is imaged and superimposed on the plane-to-be-illuminated 6 independently from each other corresponding to the relationship between the plurality of virtual secondary illuminants and the tertiary illuminants. That is, the respective rectangular images appearing on the reflecting optical element 5 and reflecting the image of the output end of the mixing rod 3 become the tertiary illuminants and the respective images as the tertiary illuminants are superimposed on the plane-to-be-illuminated 6 by the reflecting optical element 5. Ideally, it is formed as one rectangular image.

Figure 9:
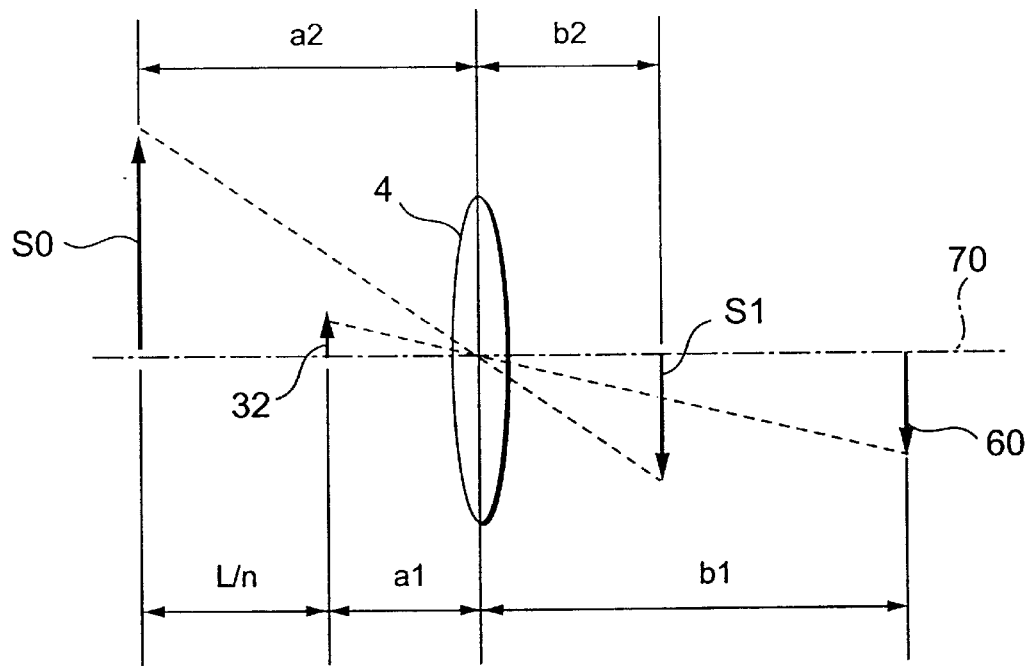
FIG. 9 is a conceptual diagram showing the paraxial imaging relationship.

FIG. 9 is a conceptual diagram showing the paraxial imaging relationship. Specifically, it shows the imaging relationship between the output end face 32 and the virtual plane-to-be-illuminated 60 caused by the first lens means 4 having a focal distance f as well as the imaging relationship between the virtual secondary illuminant plane S0 and the tertiary illuminant plane S1. It is noted that the height of the respective images or the height of the objects and their disposition are represented by arrows and they are denoted by the same reference numerals described above.

By the way, the first lens means 4 is disposed so that the output end face 32 of the mixing rod 3 and the virtual plane-to-be-illuminated 60 has the imaging relationship. The distance between the output end face 32 and the first lens means 4 is set as a1 and the distance between the first lens means 4 and the virtual plane-to-be-illuminated 60 as b1. Meanwhile, the distance between the first lens means 4 and the virtual secondary illuminant plane S0 is set as a2 and the distance between the image plane thereof, i.e., the tertiary illuminant plane S1, and the first lens means 4 as b2. The distance between the output end face 32 and the virtual secondary illuminant plane S0 may be expressed as L/n, where L is the length of the mixing rod 3 and n is the index of refraction. The following expressions (1) through (4) hold from those described above and the paraxial disposition, i.e., the distance b2, where the tertiary illuminant is formed may be found from the expression (4):

$$a1^{-1}+b1^{-1}=f^{-1} \quad (1)$$

$$a2^{-1}+b2^{-1}=f^{-1} \quad (2)$$

$$a2=L/n+a1 \quad (3)$$

From the expressions (1) through (3), $$b2=\{a1 \cdot b1 \cdot (a1+L/n)\}/\{(a1+b1) \cdot (a1+L/n)-a1 \cdot b1\} \quad (4)$$

For instance, when a1=50 mm and b1=150 mm, f=37.5 mm from the expression (1). Further, when n=1.52 and L=60 mm, b2≈64.56 mm from the expression (4). Still more, a2=89.47 mm from the expression (3).

It is noted that the first lens means 4 may be actually composed of a plurality of lenses and there is a possibility that the tertiary illuminant plane is formed within the whole lens system in this case. However, the first lens means 4 may be designed so that it will not interfere with the disposition of the reflecting optical element 5 by including the position of the tertiary illuminant plane prescribed from the above-mentioned imaging relationship in the condition.

Further, because b1/a1=3 in the above-mentioned numerical values, it is suited for illuminating the analogous plane-to-be-illuminated having a diagonal length corresponding to about three times of a diagonal length of the mixing rod 3. It will be understood that the ratio of the size of the tertiary illuminant to the size of the virtual secondary illuminant is almost equal to b2/a2 at this time and a reduced image of about 0.72 times is formed in case of the above-mentioned numerical values. Further, because the tertiary illuminant group is converged by the first lens means 4 and is formed within the convergent flux heading to the virtual plane-to-be-illuminated 60, the size of the effective tertiary illuminant plane including all of the tertiary illuminants becomes smaller than the effective diameter of the first lens means 4. Accordingly, the reflecting optical element 5 may be created in a compact size, thus contributing to the miniaturization and lightening of the device.

Figure 10:
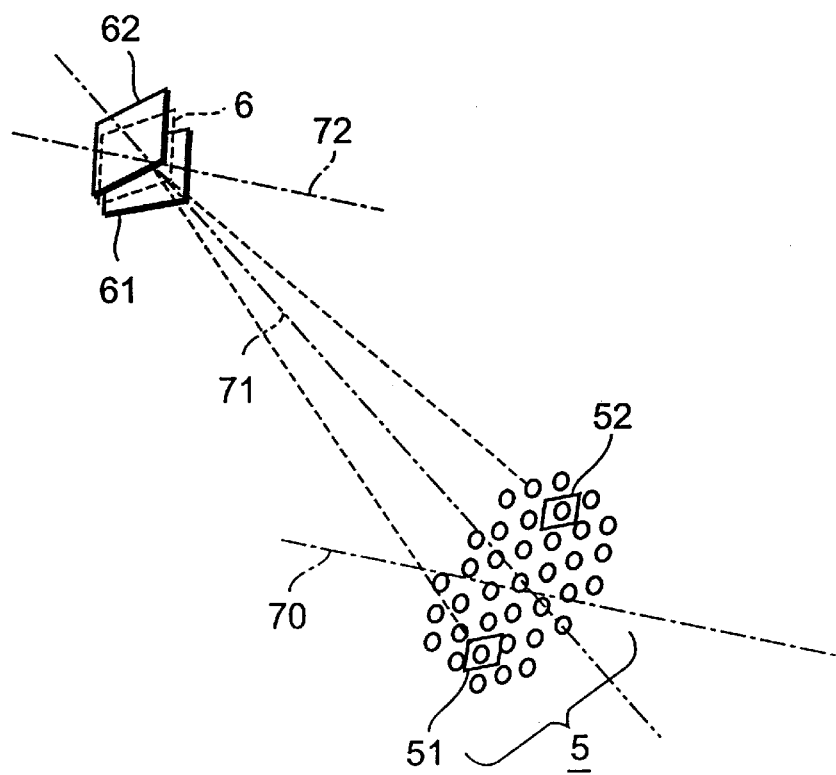
FIG. 10 is a schematic diagram showing the relationship between a micro-reflecting element and an plane-to-be-illuminated.

By the way, there exist rays deviated out of the paraxial area in the actual optical system and it becomes necessary to control the imaging position of the output end face 32 in the range in which the above-mentioned imaging relationship does not hold. FIG. 10 is a schematic diagram showing the state in which rays reflected by the micro-reflecting elements 51 and 52 comprising the peripheral portion of the reflecting optical element 5 disposed on the tertiary illuminant plane found from the above-mentioned expressions (1) through (4) are guided to the plane-to-be-illuminated 6 indicated by a dotted line. Because the distance between the micro-reflecting optical element 51 and the plane-to-be-illuminated 6 is longer than the distance between the other micro-reflecting optical element 52 and the plane-to-be-illuminated 6 as is apparent from the disposition shown in the figure, an image 61 of the output end face 32 created by the micro-reflecting optical element 51 is formed before the plane-to-be-illuminated 6 and an image 62 of the output end face 32 created by the micro-reflecting optical element 52 is formed behind the plane-to-be-illuminated 6. Such dislocation of the imaging planes reduces the efficiency of the illumination as a result.

The above-mentioned dislocation of the imaging planes is a phenomenon which takes place because the plurality of micro-reflecting planes are disposed on the tertiary illuminant plane and the deflecting direction of the respective reflecting planes are set corresponding to the respective tertiary illuminants. For instance, when a plane mirror is inserted instead of the reflecting optical element 5 by inclining a predetermined angle with respect to the optical axis, principal rays corresponding to the respective tertiary illuminants cross again on the plane-to-be-illuminated after being reflected by the plane mirror. As a result, although the respective illuminated planes are superimposed on the plane-to-be-illuminated, it becomes difficult to obtain the effect of uniform illumination because the superimposed illuminated plane is inclined largely from the plane-to-be-illuminated. From what is described above, it is possible to form the optimum illuminating flux for uniformly illuminating the plane-to-be-illuminated from the oblique direction by adjusting the direction of the principal ray and the position of the image of the output end face caused by the respective illuminating flux, i.e., by optimizing the angle and the position of the respective micro-reflecting planes and the shape of the reflecting plane.

Figure 11:
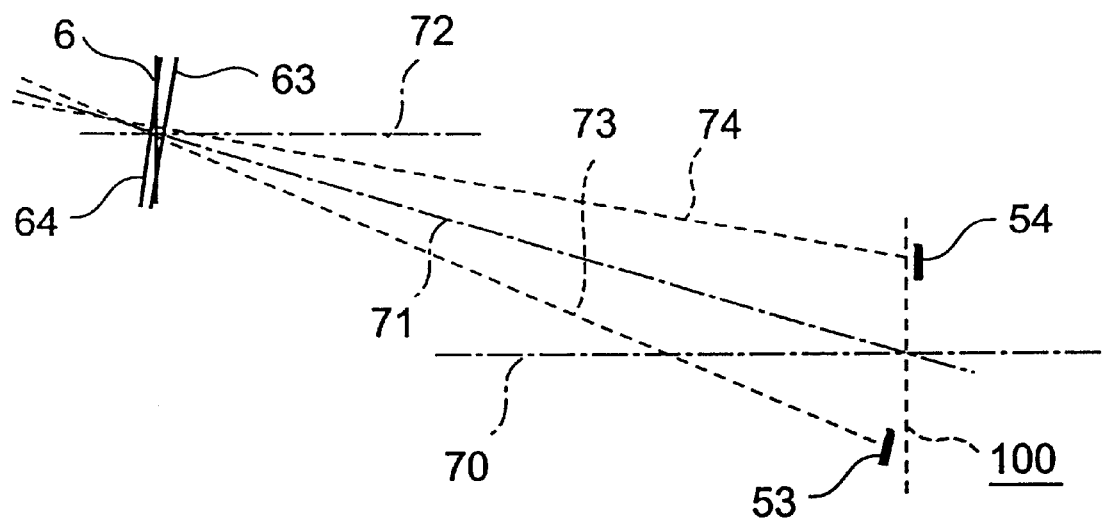
FIG. 11 is a schematic diagram showing an operation of the micro-reflecting optical element.

FIG. 11 is a schematic diagram for explaining the operation of the micro-reflecting optical element for which the above-mentioned adjustment of the imaging plane has been made. The reference numerals (73 and 74) are principal rays of the light reflected by the micro-reflecting planes 53 and 54 and (63 and 64) images of the adjusted output end face of the mixing rod. The micro-reflecting planes 53 and 54 are disposed at the positions separated from the original plane of the tertiary illuminant group 100 for the purpose of the adjustment. The micro-reflecting plane 53 distant from the plane-to-be-illuminated 6 is adjusted in the direction of approaching to the plane-to-be-illuminated 6 from the tertiary illuminant group 100 and the micro-reflecting plane 54 closer to the plane-to-be-illuminated 6 is adjusted in contrary in the direction of receding from the plane-to-be-illuminated 6. Meanwhile, the positions where the principal rays cross with the optical axis 72 are adjusted by the angle of the respective micro-reflecting planes. The superimposed illuminating fluxes may be optimized by repeating the adjustment as described above while observing the illumination state of the illuminated plane 6 or by calculation.

It is noted that analysis of illumination by means of ray tracking is effective for estimating the effective size of the tertiary illuminant and for deciding the size as well as the disposition of the respective micro-reflecting planes. At first, independent analysis is implemented on the respective tertiary illuminants to estimate the illumination state of the plane-to-be-illuminated from the superimposition of the illuminating fluxes caused by all of the micro-reflecting planes. Then, such analysis is repeated until when the desired illuminating characteristic can be obtained. The shape of the micro-reflecting plane needs not be always plane and various surfacial shapes such as aspherical surface, a spherical surface and discontinuous surface may be used as parameters for the optimization. It is noted that the reflecting optical element may take any shape as a whole under any condition prescribing the reflecting plane.

Figure 12:
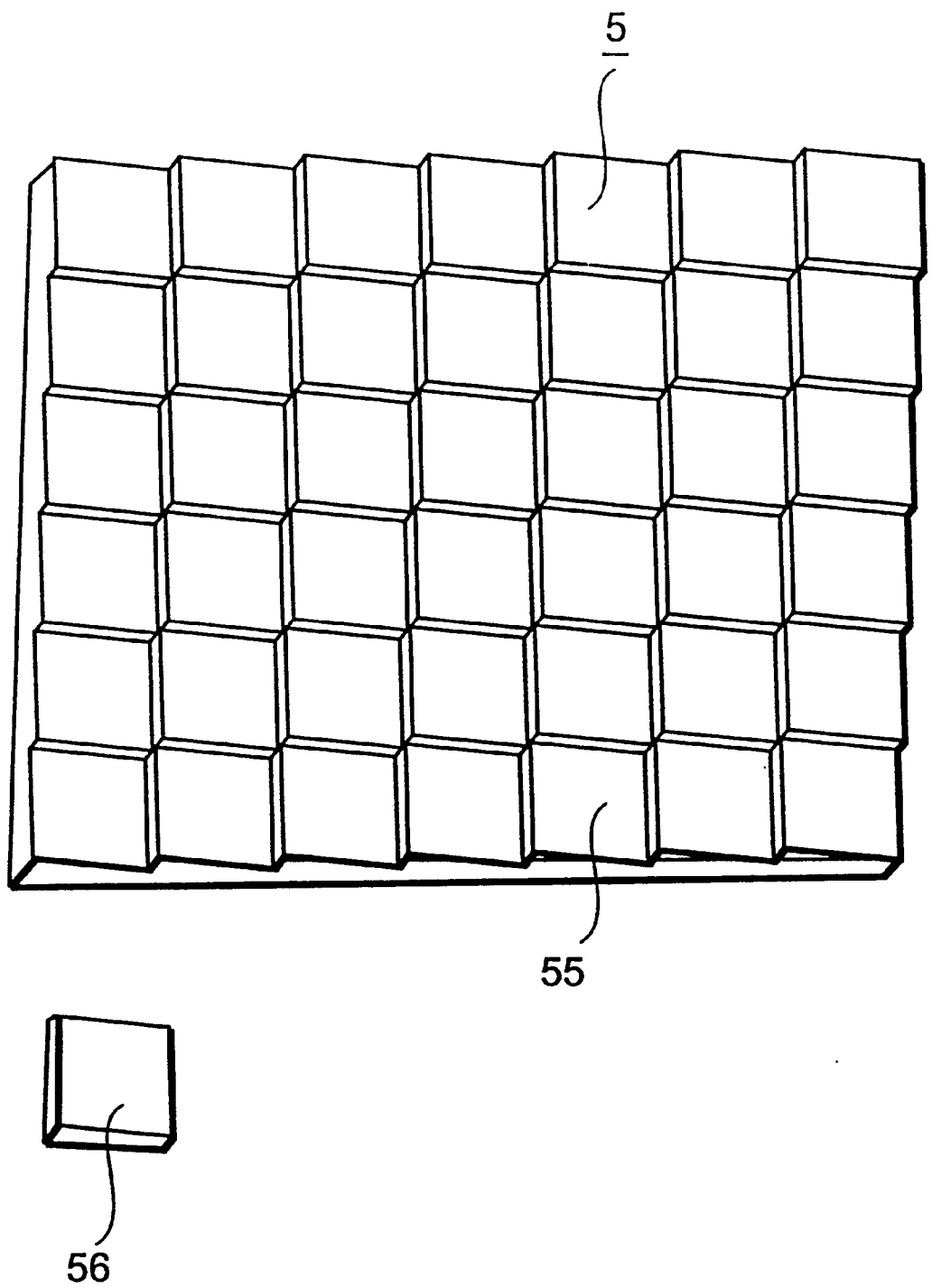
FIG. 12 is a schematic diagram showing a concrete structural example of the reflecting optical element.

FIG. 12 is a schematic diagram showing a concrete structural example of the reflecting optical element comprising the optimally designed micro-reflecting planes. In the figure, the reference numeral (5) denotes the reflecting optical element, (55) the micro-reflecting plane and (56) a micro-reflector which is the minimum unit of the optimum design. The reflecting optical element 5 may be constructed as an element in which the respective independently optimized micro-reflecting planes 55 under a certain illuminating condition are arrayed discontinuously. It is noted that the reflecting plane of the micro-reflector 56 which is the minimum unit of the optimum design, i.e., the shape of the opening thereof, needs not be the same as shown in FIG. 12 and the size and disposition thereof may be changed variously corresponding to the characteristics of the tertiary illuminant. Further, any molding method may be used as long as the accuracy of the micro-reflecting plane 55 of the reflecting optical element 5 is assured. For instance, the reflecting optical element 5 having high reflectivity may be realized by forming a reflecting film of a metal thin film such as aluminum or a dielectric multi-layered film on a base material such as glass, plastic and ceramic.

Figure 13:
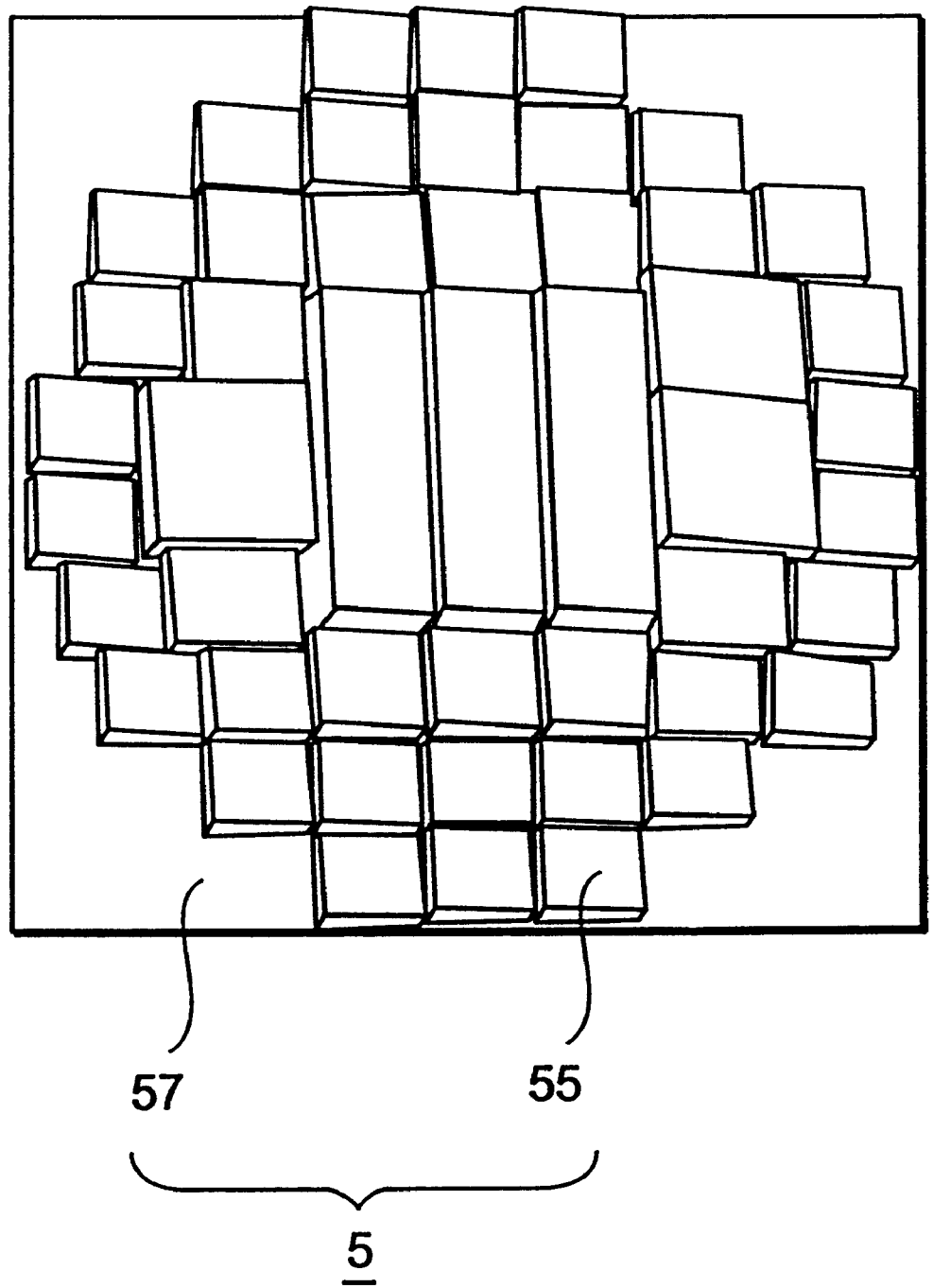
FIG. 13 is a schematic diagram showing a concrete modified structural example of the reflecting optical element.

FIG. 13 is a schematic diagram showing a concrete modified structural example of the reflecting optical element 5. In FIG. 13, the reflecting optical element 5 is composed of a reflecting part composed of the micro-reflecting planes 55 and a base material part 57. The whole reflecting plane is constructed by combining micro-reflecting planes 55 having different sizes. When the output end face of the mixing rod (uniforming means) is rectangular, there is a case when a number of times of the total reflection differs in the long edge direction and the short edge direction of the rectangle and the distribution of the tertiary illuminants is not symmetrical about the center point. Further, the shape of the tertiary illuminant group is deformed from the rectangle into the shape of barrel which is distorted to the outside or into the shape of bobbin which is distorted to the inside depending on the performance of the lens system of the first lens means 4, so that the disposition and shape of the respective micro-reflecting planes need to be set corresponding to that. It is noted that while the base material part 57 is provided to hold the reflecting optical element 5, it may be eliminated by adopting another effective holding method.

Figure 14:
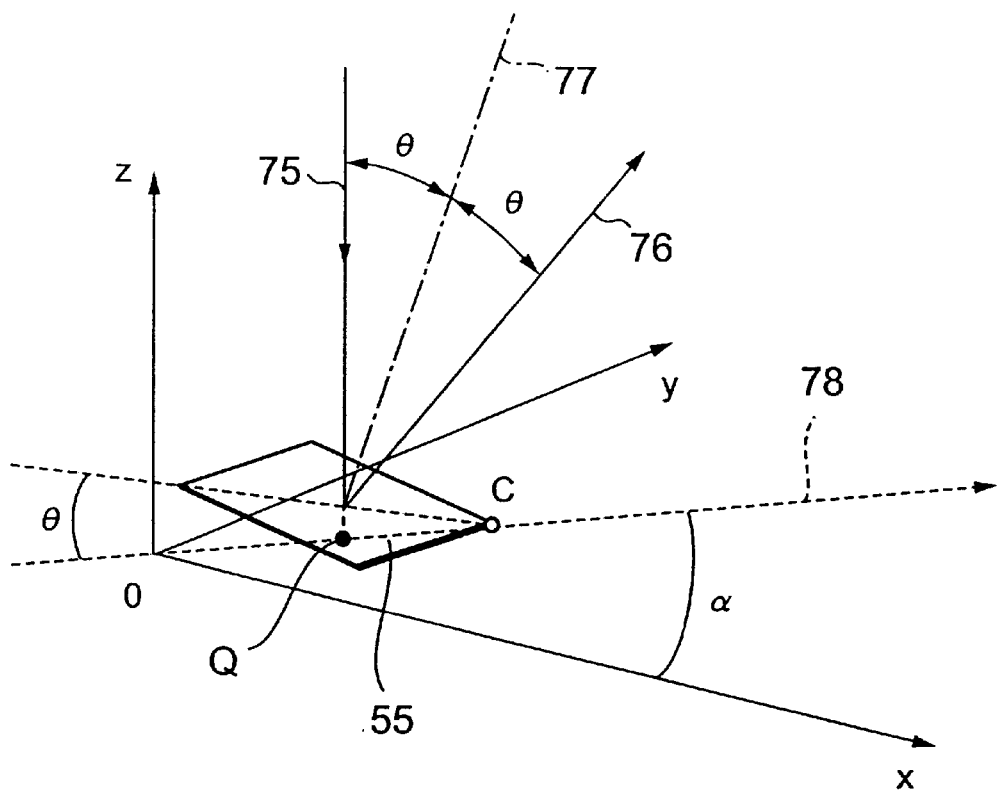
FIG. 14 is a schematic diagram showing a micro-reflecting plane in an x, y and z coordinate system.

FIG. 14 is a schematic diagram showing the micro-reflecting plane 55 in an x, y and z coordinate system. In FIG. 14, the reference numerals (75 and 76) denote rays incident on and reflected by the micro-reflecting plane 55. The incident ray 75 is parallel with the z-axis. An angle formed between a normal line 77 of the micro-reflecting plane 55 and the incident ray 75 is assumed to be $\theta$. Then, an angle formed between the reflected ray 76 and the normal line of the micro-reflecting plane 55 becomes also $\theta$.

The reference numeral (78) denotes a straight line connecting a point Q where the extension line of the incident ray 75 crosses with the x-y plane and the origin O and an angle formed between it and the x-axis is assumed to be $\alpha$. Because the line 78 coincides with orthogonal projection of the reflected ray 76 onto the x-y plane, the plane-to-be-illuminated is set in the direction of a with respect to the micro-reflecting plane 55 when the whole system is seen from the z-direction. It is noted that although the plane-to-be-illuminated is not shown in FIG. 14, it is the same one with the plane-to-be-illuminated 6 shown in FIGS. 6 and 7.

When the desired reflecting direction with respect to the direction of the incident ray 75, i.e., the angle $2\theta$, is decided, the micro-reflecting plane 55 just needs to be inclined by the angle $\theta$ with respect to the x-y plane and the ray may be inputted from the direction inclined from the normal line by the angle $2\theta$ with respect to the plane-to-be-illuminated by setting the plane-to-be-illuminated on a plane parallel to the x-y plane. Thus, the initial value of the optimum design may be found for all of the micro-reflecting planes.

For instance, when the reflecting optical element 5 is applied to the illumination of the DMD described above, conditions required for the illuminating flux are that the inclination of the DMD with respect to the normal line is 20 degrees and that the ray is inputted from the direction turned by 45 degrees from the direction of the edge of the DMD in the azimuth direction (direction of the angle α formed between the x-axis and the line 78 in FIG. 14) around the normal line of the DMD. Accordingly, in the configuration shown in this figure, it is desirable to implement the optimal design by using the micro-reflecting planes which are set so that α=45 degrees and θ=10 degrees as the initial values.

As described above, the reflecting optical element 5 excels in the heat radiating characteristic because it is a reflecting element and it can be formed into the shape of a thin plate in particular. Therefore, it may be structured as an element resistant to thermal destruction even though it is disposed at the spot where the diameter of the flux is thinly narrowed down. Then, because the heat resistance of the reflecting optical element 5 may be enhanced as described above, it allows an extra cooling mechanism to be eliminated and a light-weight and small device to be advantageously realized.

In addition to that, because it may be designed so that the thickness of the whole element does not change remarkably depending on regions thereof, it is strong against thermal deformation and the degradation of the optical performance caused by temperature change may be kept minimum. From these facts, it is characterized in that it enables the optimum design to be attained by placing the emphasis on the improvement of the reflecting characteristic and the uniform illumination of the plane-to-be-illuminated and that the degree of freedom of the design 5 also large.

Figure 15:
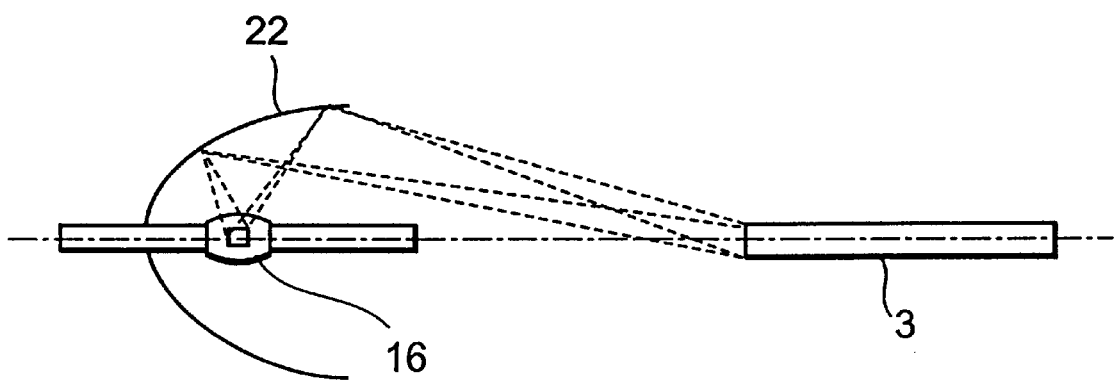
FIG. 15 is a schematic diagram showing a modified example of an illuminating optical system using an ellipsoidal mirror.
Figure 16:
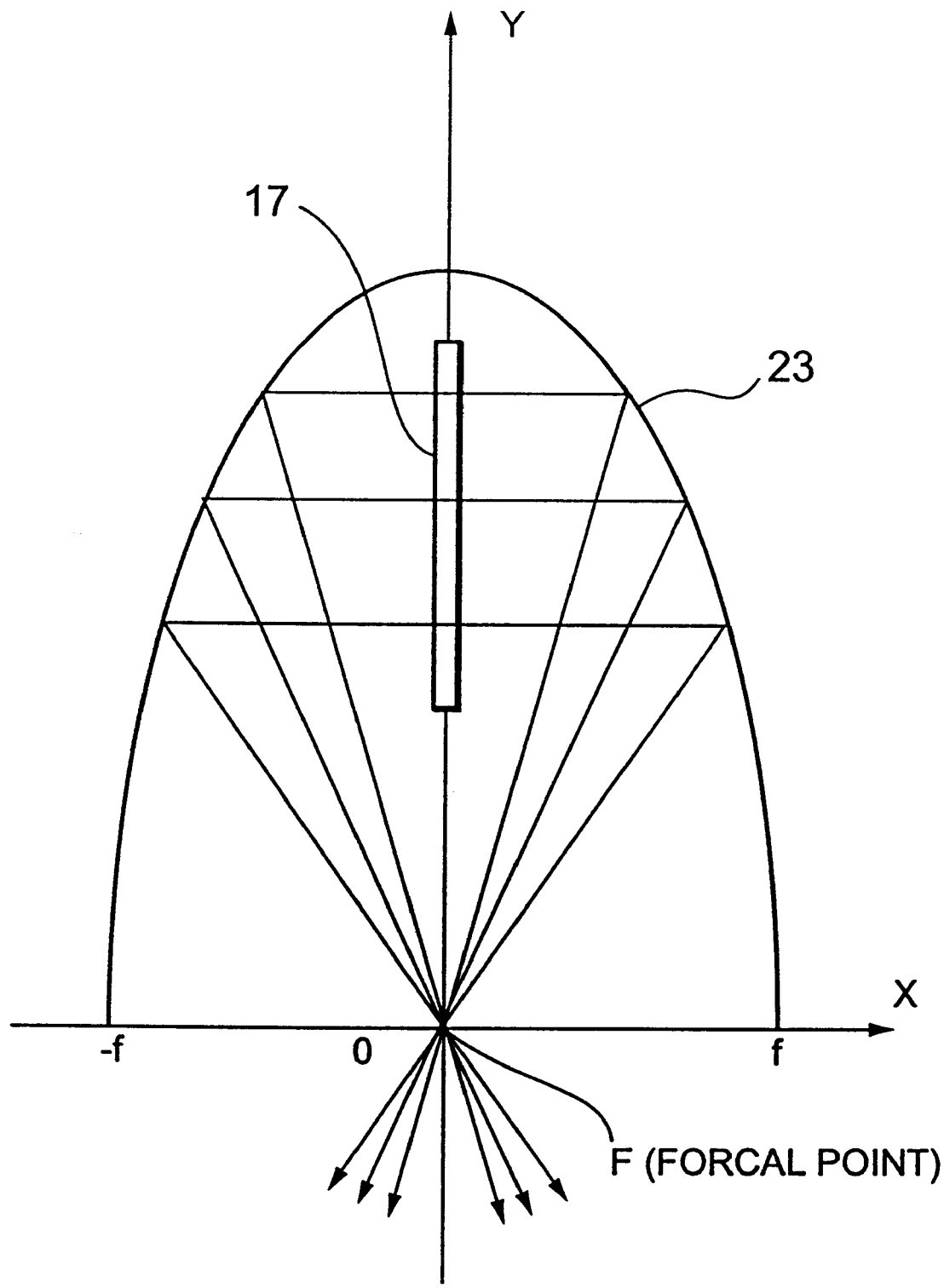
FIG. 16 is a schematic diagram showing an operation of an orthogon, parabolic mirror.

While it is apparent that the smaller the effective diameter of the secondary illuminant formed in the vicinity of the input end face of the mixing rod 3, the more the utility factor of light is readily improved as it is apparent from the above-mentioned explanation, the light condensing method is not confined only to the above-mentioned combination of the reflecting mirror 20 of the rotational parabolic surface and the condenser lens 21. For instance, FIG. 15 shows an illuminant unit of the type of condensing light radiated from a high luminance lamp 16 such as a xenon lamp, a metal halide lamp and a high pressure mercury lamp and shows a state in which the light emitted from a light emitting section of the high luminance lamp 16 disposed in the vicinity of a first focal point of an ellipsoidal mirror 22 is reaching to the input end face of the mixing rod 3 disposed in the vicinity of a second focal point of the ellipsoidal mirror 22. FIG. 16 shows an example in which an orthogonal parabolic reflector (OPR) 23 is used as another type reflecting mirror. A normal parabolic reflector uses a curved surface whose (x, y) section may be obtained by rotating a curve given by the following expression (5) around the x-axis where its focal distance is f:

$$y^2 = 4fx \quad (5)$$

Meanwhile, the orthogonal parabolic reflector 23 uses a curved surface obtained by rotating a curve given by the following expressions (6) and (7) around the y-axis.

$$Y = 2\{f(f+X)\}^{1/2} \text{ (where, } -f < X < 0) \quad (6)$$

$$Y = 2\{f(f-X)\}^{1/2} \text{ (where, } 0 \leq X \leq f) \quad (7)$$

In FIG. 16, the reference numeral (17) denotes a linear illuminant, (23) the orthogonal parabolic reflector and (F) a focal position of the orthogonal parabolic reflector 23. The orthogonal parabolic reflector 23 has an operation of condensing rays outputted in the direction approximately vertical to the linear direction of the linear illuminant 17 effectively to one point of the focal position F when the linear illuminant 17, e.g., a discharge arc of the metal halide lamp, is disposed on the Y-axis, i.e., the axis of rotation. It is desirable to dispose the linear illuminant 17 on the axis of rotation of the orthogonal parabolic reflector 23 also in the present invention.

While the invention includes the various condensing methods described above, it is of course possible to apply a method of effectively utilizing light which has been diverged in the direction of an opening of the reflector and not utilized by combining primary and secondary mirrors or a method of enhancing the condensing efficiency by composing a reflecting plane by continuously splicing a plurality of rotational secondary curved surfaces which differ depending on regions. It is also possible to eliminate the reflector itself when an illuminant having strong directivity is used. For example, an illuminant such as a light emitting diode and a surface light emitting laser may be used and the similar uniform illumination effect may be obtained by constructing the illuminating optical system in the same manner as described above after obtaining the highly uniform surface illuminant by the mixing rod 3.

The method of obtaining the uniform illumination effect by forming the plane-to-be-illuminated into the rectangular shape and by superimposing and by imaging the shape of the output end face of the mixing rod 3 has been explained in the present embodiment. However, it is possible to illuminate a predetermined region to be illuminated uniformly and highly efficiently by using other various columnar rods such as a cylindrical rod and an elliptic cylindrical rod, instead of the mixing rod 3. It is also possible to set so that the whole or part of such rod is tapered or inversely tapered such that the input end face is analogous to the output end face while having a different area.

Figure 17:
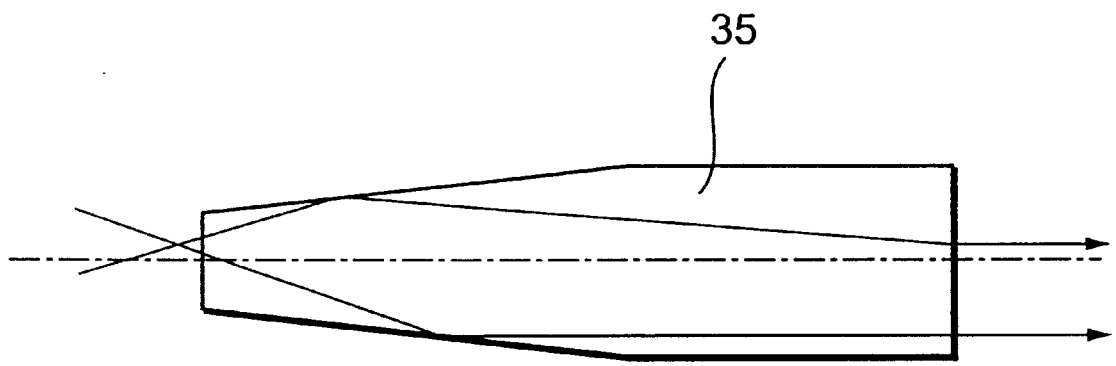
FIG. 17 is a schematic diagram showing a claviform rectangular rod.

FIG. 17 is a schematic diagram showing a claviform rectangular rod 35 whose output side is large. While the parallelism of the rays totally reflected by the inner surface becomes high as indicated by arrows in FIG. 17, the parallelism of the rays becomes low when it is tapered in contrary. The parallelism which differs in the directions of the long edge and the short edge of a rectangle may be controlled by setting the cone angle on the rod as described above. The design of the illuminating optical system may be diversified further by combining with the operation of the lens system of the following first lens means 4. Although there is a possibility that the distribution of the tertiary illuminants deviates greatly from the state close to equal intervals by setting such cone angle, it is possible to deal with it by optimizing the micro-reflecting planes comprising the reflecting optical element 5.

Figure 18:
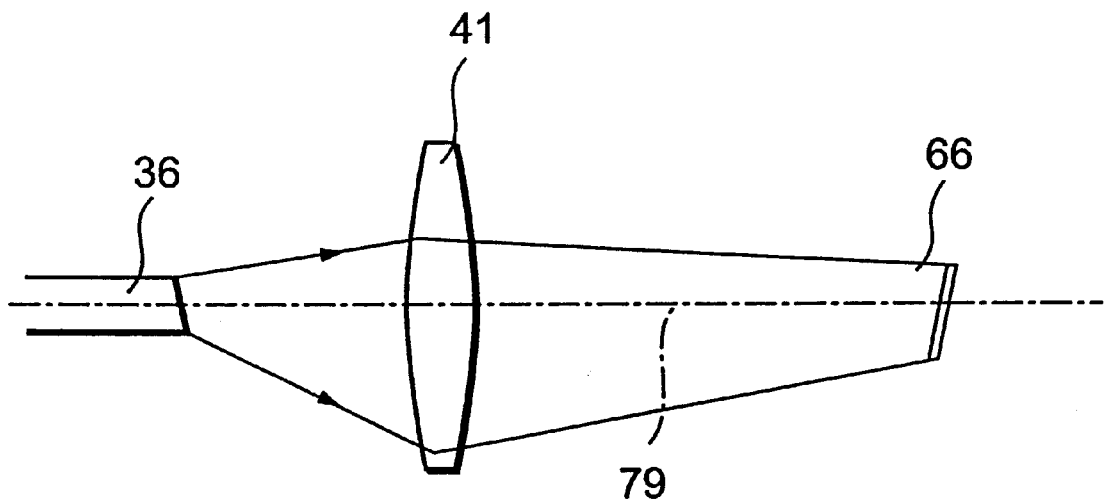
FIG. 18 is a schematic diagram showing a rod whose output end face is not-vertical to the optical axis.

It is also possible to reduce the difference of the angles between the imaging plane of the output end face and the plane-to-be-illuminated in advance by tilting the output end face of the mixing rod 3 slightly from the plane vertical to the major axis of the rod. Rays diverged from a rod 36 whose output end face is not vertical to the optical axis are distributed asymmetrically about the optical axis 79 as shown by arrows in FIG. 18. Accordingly, an image 66 of the output end face of the rod 36 is inclined with respect to the optical axis 79 by the imaging operation of the first lens means 41. It is noted that it is difficult to exert the effect of the oblique input of the illuminating light required by the plane-to-be-illuminated all by such inclination of the output end face of the rod in many cases. For instance, because the inclination of rays becomes too large when the inclination of the output end face is too large, the diameter of the following first lens means 41 must be increased, thus increasing the volume of the whole optical device. Then, there is a possibility that the inclination of the above-mentioned rays may be suppressed depending on the conditions of the sectional profile and the length of the rod 36 when the input end face of the rod 36 is inclined with respect to the optical axis 79 in the same manner. The above-mentioned modification is very effective as long as it is used for compensating the operation of the reflecting optical element 5 of the optical device and within a range not causing a problem in miniaturizing and lightening the device.

As described above, according to the present embodiment, the plurality of tertiary illuminants are formed by imaging the group of the secondary illuminants virtually formed based on the total reflection of the light on the side face of the mixing rod. Then, because the reflecting optical element is disposed corresponding to the position of the plurality of tertiary illuminants, it can reflect the illuminating flux having the predetermined flux distribution and the distribution of intensity effectively, can form the image of the output end face of the mixing rod on the plane-to-be-illuminated and can illuminate the plane-to-be-illuminated by the illuminating flux having the uniform distribution of intensity.

Accordingly, the optical device of the invention allows the plane-to-be-illuminated to be uniformly illuminated by inputting the illuminating flux from the direction having a predetermined inclination from the normal line of the plane-to-be-illuminated with the simple structure. It also enables to provide the optical device whose utility factor of light is high because it can effectively condense the light emitted from the illuminant. Further, when the output end face of the mixing rod is formed into the shape analogous to the shape of the plane-to-be-illuminated, it is possible to provide the optical device which can illuminate the plane-to-be-illuminated effectively by suppressing the loss of light. Still more, because it ispossible to set the mixing rod so that at least one of the input end face and the output end face is inclined from the plane vertical to the longitudinal axis of the rod, it allows the design of high degree of freedom in optimizing the reflecting optical element for the oblique illumination of the plane-to-be-illuminated. Moreover, because the degree of freedom in the direction of the optical path bent by the reflecting optical element is large, the optical device which is compact as a whole may be readily realized.

Second Embodiment

Figure 19:
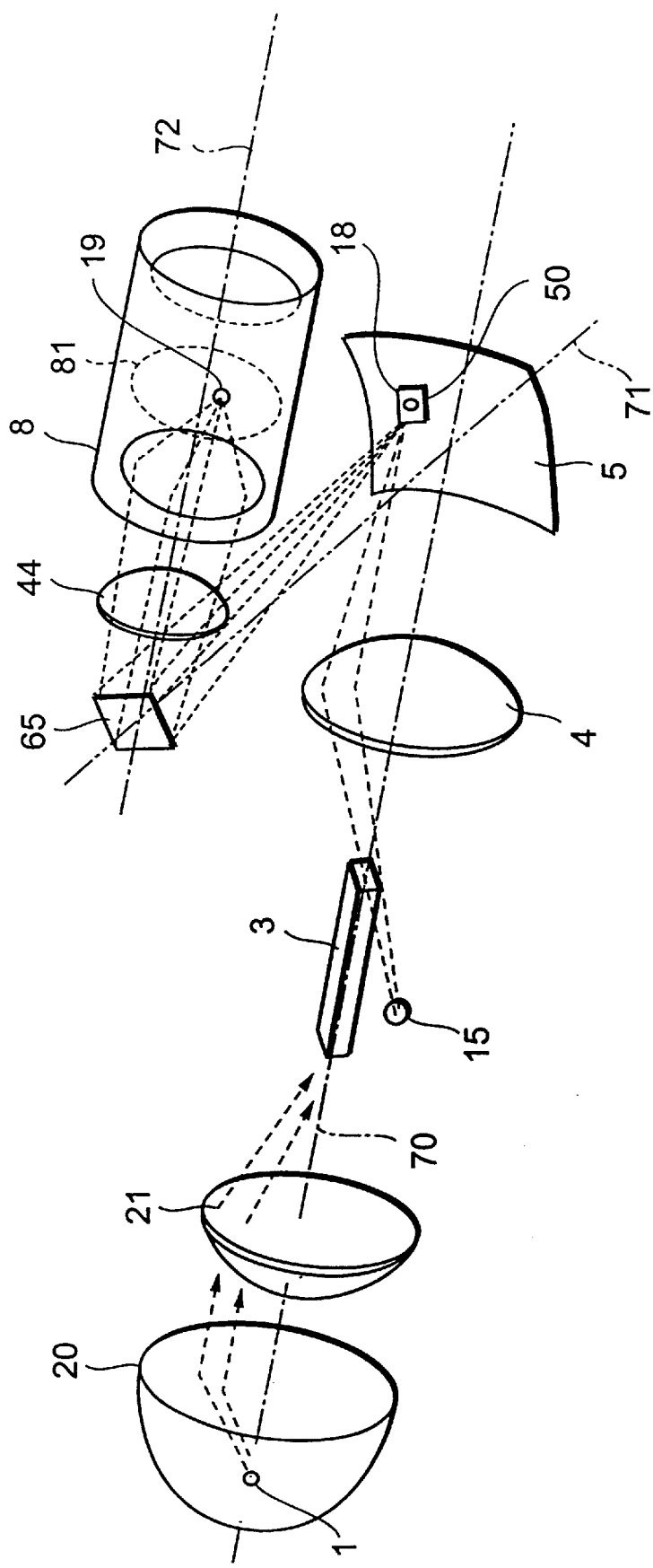
FIG. 19 is a schematic diagram showing the structure of a projector unit according to a second embodiment.

An illuminating optical system of a projector unit of a second embodiment of the invention will be explained below. FIG. 19 is a schematic diagram showing the structure of the projector unit using a reflecting type light bulb 65. It is what the optical device described in the first embodiment is applied to the illuminating optical system. A device which requires illumination from the direction other than the normal direction, i.e., the oblique direction, is desirable for the reflecting type light bulb 65 and the DMD (Digital Micro-mirror Device) explained in the description of the prior art is suited. Projector lens means (third lens means) 8 is disposed at the position facing to the reflecting type light bulb 65 and an image formed on the reflecting type light bulb 65 is magnified and projected on screen means not shown. Dotted lines show states when a virtual secondary illuminant 15 forms a tertiary illuminant 18 by the first lens means 4 and forms an illuminant image 19 again after being reflected by the reflecting type light bulb 65. This illuminant image 19 is formed around an entrance pupil 81 of the projector lens means 8, thus structuring a highly efficient projector unit whose illumination is highly uniform. It is noted that because the other reference numerals are the same with those in FIG. 6, their explanation will be omitted here.

By the way, when the reflecting type light bulb 65 is composed of the micro-reflecting mirror like the above-mentioned DMD, the flux, which is optically modulated after reflection enters the projector lens 8 as a divergent flux when the incident illuminating flux, is divergent. In case of a convergent illuminating flux, the flux enters the projector lens 8 while keeping the convergence even after it is reflected by the reflecting type light bulb 65. It is also possible to add a field lens 44 as shown in FIG. 19 in order to form the image of the tertiary illuminant group on the entrance pupil exactly. In any case, the projector lens 8 will do if it has a diameter of the pupil enough for imaging the tertiary illuminant formed around the reflecting optical element 5 on the pupil of the projector lens 8 again and it has the adequate pupil position.

In a telecentric lens by which a principal ray becomes parallel with the optical axis, the Position of the exist pupil is infinitely far and the diameter of the pupil is infinitely large. Therefore, although the tertiary illuminant group is not imaged again at the position of the pupil within the projector lens 8 as shown in FIG. 19, it can condense the light from the telecentricly illuminated reflecting type light bulb efficiently. Various types of projector lens 8 may be used as long as it can exhibit the predetermined optical performance as the projector unit as described above.

The largest characteristic point of the so-called illuminating optical system in the projector unit of the present embodiment is that the imaging optical system for imaging the secondary plane illuminant caused by the mixing rod 3 on the reflecting type light bulb 65 is configured. The structure of the first lens means 4 typified by one lens in the explanation so far needs to satisfy the illuminating condition required by the reflecting type light bulb 65 and to assure a spatial margin for inserting at least the reflecting optical element 5. For instance, the first lens means 4 may be applied to an afocal system shown in FIG. 20 because it forms an image at finite position for an object at the finite distance even though it forms an infinite image for an object at the infinite distance. The imaging relationship of the afocal system will be explained below with reference to FIG. 20.

When the output end face of the mixing rod 3 positioned behind an object side focal point Ff1 of a first lens 42 by a distance z1 is imaged finally at the position behind an image side focal point Fb2 of a second lens 43 by a distance z2, the following expressions (8) and (9) hold:

$$z2=-f2^2/z1=(f2/f1)^2 \cdot z1 = z1/m^2 \quad (8)$$

$$\beta=(f1/z1)\cdot(-z2/f2)=-(f1/f2)\cdot(1/m^2)=1/m \quad (9)$$

where, m is an afocal magnification (=−f1/f2) and β is a horizontal magnification. The afocal magnification is set so as to coincide almost to the imaging magnification decided by the size of the output end face of the mixing rod and the image displaying plane of the reflecting type light bulb. It is noted that f1 and f2 are focal distances of the first and second lenses 42 and 43.

Accordingly, when the reflecting type light bulb 65 is disposed at the image position z2 found from the expression (8), the degree of freedom for composing the optical system increases in magnifying or reducing the image of the output end face of the mixing rod 3 into a desirable size because the image magnification may be set regardless of the position of the object image. Further, because the outgoing rays are parallel to the optical axis when the rays incident on the afocal system are parallel to the optical axis, it may be said as an optical system suited for guiding all of the rays diverged from the output end face of the mixing rod efficiently to the plane-to-be-illuminated.

Figure 20:
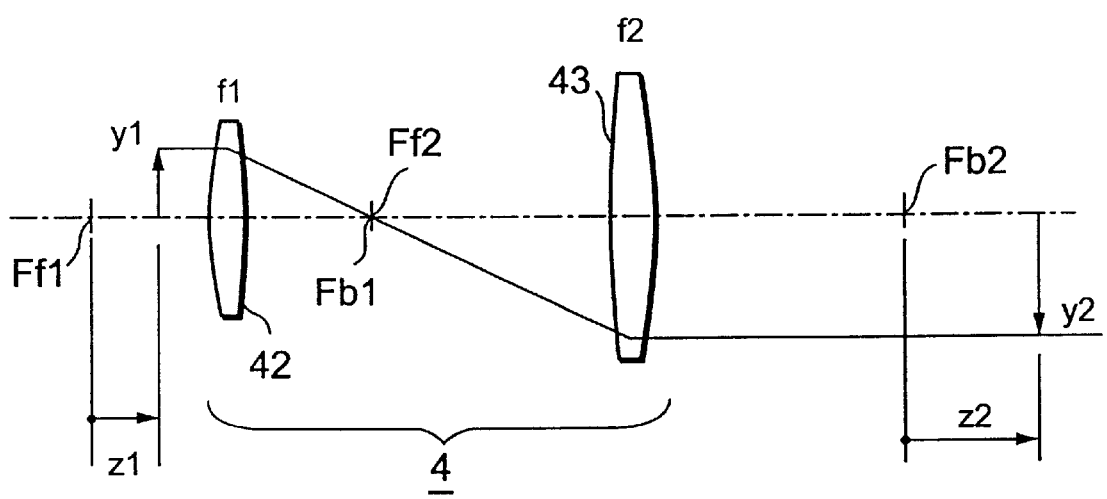
FIG. 20 is a schematic diagram showing an operation of an afocal system.

The afocal system explained in FIG. 20 is a basic structure and the first lens 42 and the second lens 43 may be actually a first lens group and a second lens group composed of a plurality of lenses so as to share respective focal points as a matter of course. Because the tertiary illuminant is formed at the predetermined position in accordance to setting of the first or second lens group in any case, the illuminating optical system must be optimized under the conditions of inserting the reflecting optical element 5 within the afocal system and of avoiding interference of the reflecting flux and the first lens means 4. It is of course possible to insert not only a lens but also a reflecting mirror or the like within an optical path in order to avoid the interference of the reflecting flux and the first lens means 4.

Figure 21:
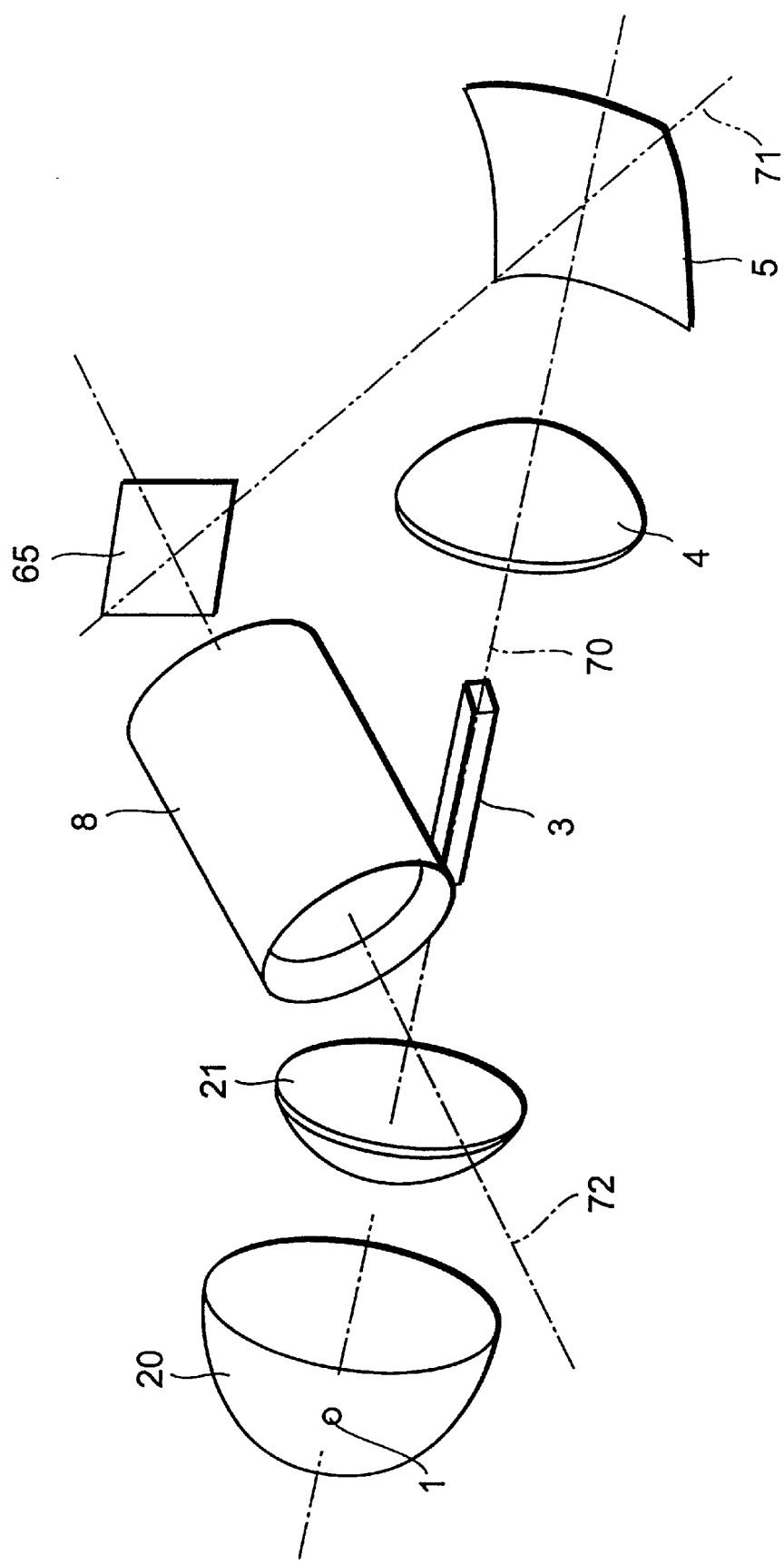
FIG. 21 is a schematic diagram showing the structure of a modified example of the inventive projector unit.

The projector unit is often required to have a compact optical path in which the disposition of the structural elements is contrived for the purpose of miniaturization. FIG. 21 is a schematic diagram showing he structure of a modified example of the projector unit. The reference numerals are common with those in FIG. 19, so that their explanation will be omitted here. Although the optical axis 70 of the illuminating optical system has been disposed so that it is almost parallel with the normal line 72 of the reflecting type light bulb 65 in FIG. 19, they are disposed so as to cross almost at right angles in the present modified example. It is of course possible to adopt the structure in which the optical axes cross each other in stereo as shown in FIG. 21 when it is the illuminating optical system that satisfies the illuminating condition required by the reflecting type light bulb 65.

It is also needless to say that all of the illuminating optical systems and their modified examples explained in the first embodiment are applicable to the projector unit of the second embodiment.

Third Embodiment

Figure 22:
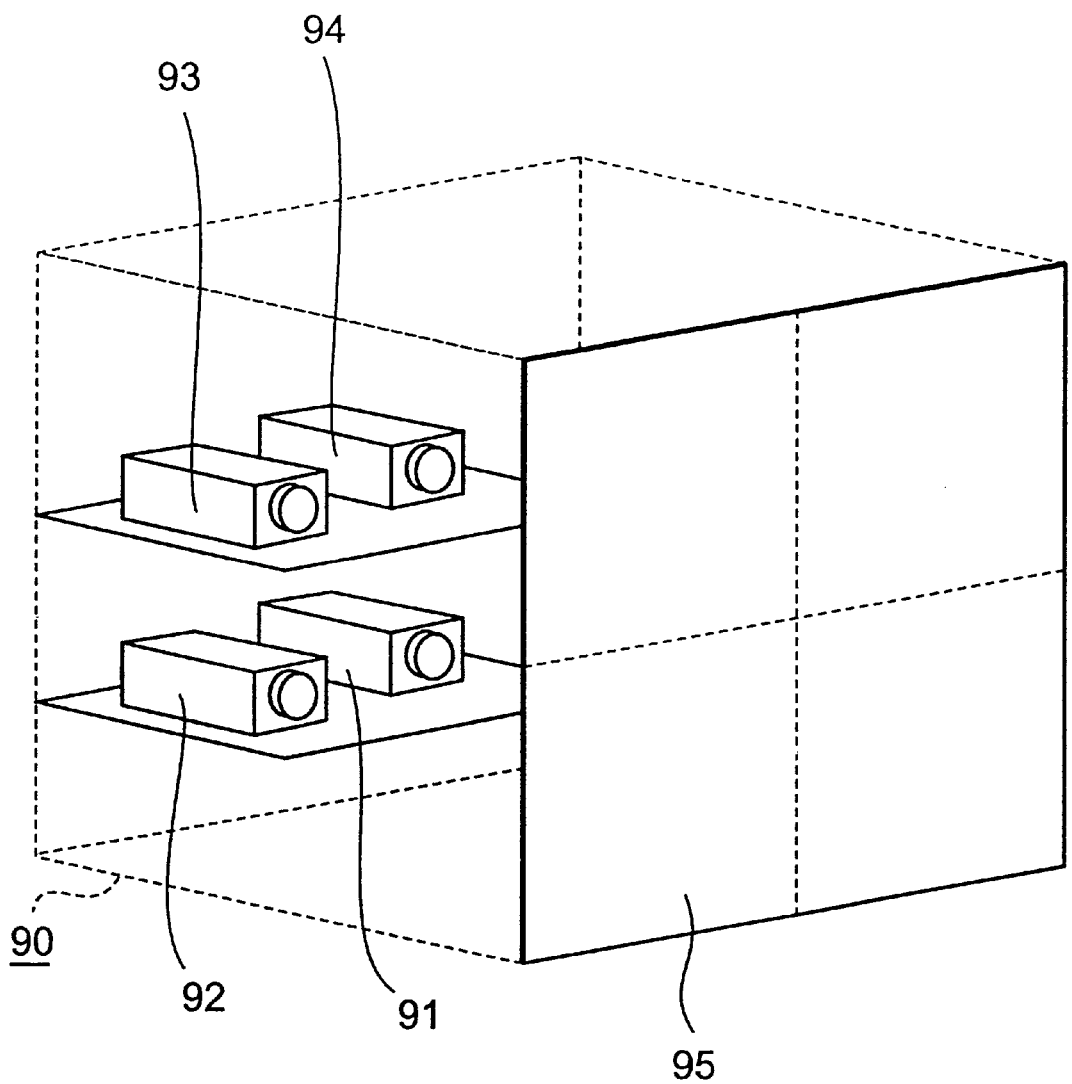
FIG. 22 is a schematic diagram showing the structure of a multi-projector system of the invention.

A multi-DMD projector unit according to a third embodiment of the invention will be explained below. FIG. 22 shows the structure of a projector system of multi-screens (four screens in the present embodiment) using four front projector units each of which comprise the optical device of the invention and the reflecting type light bulb of the DMD. In the figure, the reference numeral (90) denotes the multi-projector system, (91 through 94) the front projector units, and (95) a rear screen. It is noted that although the internal structure of the front projector units 91 through 94 is not shown, they contain the inventive reflecting optical element and can provide projected screens which excel in the uniformity of brightness as described above.

While the multi-rear projector unit 90 can take various modes in terms of a number of screens and of the internal structure thereof, one having the simplest structure will be explained here. Suppose that the respective front projector units are disposed and adjusted so that the borders of the neighboring projected images almost coincide so as to be projected on the rear screen 95 without any joint. The borders of the unit screen are represented by dotted lines on the screen 95 for convenience.

The part corresponding to the joint between the unit screens becomes a factor of dropping the image quality most on the actual multi-screen. The screen quality degenerates when there is a difference of brightness on the both sides of the joint or there is nonuniformity along the joint. It is actually possible to adjust the condition slightly and to make the nonuniformity inconspicuous relatively by changing the disposition of the projector units so as to gather angles whose brightness and color tones are close to each other at the center of the screen. However, it becomes very difficult to implement the above-mentioned adjustment when uneven brightness occurs in the diagonal direction of the unit screen. Further, it becomes difficult to make such adjustment as the number of multi-screens increases. Accordingly, it is important to reduce the uneven brightness occurring in the unit screen in order to improve the image quality of the multi-screen.

It is possible to construct the large screen multi-projector system not only by the configuration of including a plurality of projector units in one case but by arraying a predetermined number of cases, each containing a projecting optical system, horizontally and vertically. In this case, screen means corresponding to the respective projecting optical systems are disposed so as to be shared or screen means are provided separately per each case.

The front projector units 91 through 94 comprising the illuminating optical system of the inventive optical device allow the uneven brightness in the diagonal direction of the screen to be reduced, the degree of freedom of the disposition of the unit projector unit (or reflecting optical element) to be increased and the image quality of the final screen to be improved. Such effects are not influenced directly by the number of multi-screens, the type of the screen and the internal structure of the projector system 90, so that the multi-projector system of a desirable size and a number of screens may be structured. The same effects may be obtained in various arrangements including an arrangement in which a reflecting mirror is inserted between each front projector unit and the screen 95 in order to reduce the depth of the system for example. That is, reflecting means capable of inverting an image or of reducing the size of the case may be disposed within the case according to its end.

The invention may be embodied in other specific forms without departing from the spirit or essential characteristics thereof. The present embodiment is therefor to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical device comprising:

an illuminant source supplying illuminating energy in a primary illuminant beam;

a light condenser receiving and condensing the illuminant energy of said illuminant source to produce a converging illuminant beam;

a mixer receiving the converging illuminant beam and increasing the uniformity of intensity distribution across the surface of said beam passed therethrough to produce a uniform intensity illumination beam, the mixer causing total reflection therein so as to produce secondary illuminant beams within said mixer representing secondary virtual sources due to the reflection within said mixer;

a first lens group condensing the uniform intensity illumination beam to form a plurality of tertiary illuminants within an optical path, each said tertiary illuminant appearing to emanate from a secondary virtual source appearing to exist due to the reflections within said mixer; and a reflecting optical element having a reflecting plane of a shape defining the illuminant planes of said tertiary illuminants to reflect the outgoing rays of said first lens group in a desired direction.

2. The optical device of claim 1 wherein said mixer has an output face, said reflecting optical element projects a flux pattern on a plane to be illuminated which is similar to the luminous flux supplied to the output face of said mixer.

3. The optical device of claim 2 wherein said reflecting plane is a tertiary illuminant plane and wherein said reflecting optical element is formed of a plurality of micro-reflecting planes each corresponding to a single tertiary illuminant.

4. The optical device of claim 2 wherein said optical device is used in an image display, said reflecting plane is a tertiary illuminant plane and wherein said reflecting optical element is formed of a plurality of micro-reflecting planes each corresponding to as few as a single image display pixel.

* * * * *